(12) United States Patent
Eizenman et al.

(10) Patent No.: US 8,898,620 B2
(45) Date of Patent: Nov. 25, 2014

(54) SYSTEM AND METHOD FOR APPLICATION PROCESS AUTOMATION OVER A COMPUTER NETWORK

(75) Inventors: Alon Eizenman, Netanya (IL); Eran Sher, Kfar-Saba (IL); Eyal Gehasie, Rosh Ha'ayin (IL); Mirron Rozanov, Hadera (IL)

(73) Assignee: Nolio Ltd., Kfar Saba (IL)

( * ) Notice: Subject to any disclaimer, the term of this patent is extended or adjusted under 35 U.S.C. 154(b) by 1079 days.

(21) Appl. No.: 12/668,429

(22) PCT Filed: Jul. 9, 2008

(86) PCT No.: PCT/IL2008/000947

§ 371 (c)(1),
(2), (4) Date: Jul. 7, 2010

(87) PCT Pub. No.: WO2009/007967

PCT Pub. Date: Jan. 15, 2009

(65) Prior Publication Data

US 2010/0281456 A1    Nov. 4, 2010

Related U.S. Application Data

(60) Provisional application No. 60/929,677, filed on Jul. 9, 2007.

(51) Int. Cl.

| | |
|---|---|
| *G06F 9/445* | (2006.01) |
| *G06F 9/44* | (2006.01) |
| *G06F 9/50* | (2006.01) |
| *G06F 9/38* | (2006.01) |

(52) U.S. Cl.
CPC .. *G06F 8/61* (2013.01); *G06F 8/20* (2013.01); *G06F 9/445* (2013.01); *G06F 9/5038* (2013.01); *G06F 8/35* (2013.01); *G06F 9/3838* (2013.01); *G06F 9/5044* (2013.01)
USPC ........... 717/104; 717/178; 717/172; 709/203; 709/202

(58) Field of Classification Search
CPC ......... G06F 9/44; G06F 9/445; G06F 9/4443; G06F 9/46; G06F 15/16; G06F 8/20; G06F 8/35; G06F 8/61; G06F 9/3838; G06F 9/5038; G06F 9/5044
USPC ................... 717/104, 178, 172; 709/202, 203
See application file for complete search history.

(56) References Cited

U.S. PATENT DOCUMENTS

| | | | |
|---|---|---|---|
| 7,124,289 | B1 | 10/2006 | Suorsa |
| 7,152,109 | B2 | 12/2006 | Suorsa |

(Continued)

OTHER PUBLICATIONS

Office Action for Europe, Application No. 08776592.1 dated Apr. 7, 2011.

(Continued)

*Primary Examiner* — Jonathan C Teixeira Moffat
*Assistant Examiner* — Lynda Dinh
(74) *Attorney, Agent, or Firm* — Myers Bigel Sibley & Sajovec, P.A.

(57) ABSTRACT

A system and a method for automated process management of software in a computer network having a plurality of computers, including for deployment. The automated process management optionally and preferably includes modeling the software application according to one or more requirements of the computer network. The modeling also preferably includes operational modeling. This modeling bridges the gap between development and operation teams. The automated process management is preferably controlled at a management server via a console, such that one or more users may more preferably adjust the process management or at least optionally view progress of any actions within the automated process performance. Such management server preferably enables the software product to be deployed, managed, verified, monitored and tracked from a single location. More preferably, the system and method provide management reports, for generating deployment and/or other automated process management reports for the technical (software professional and/or deployment professional) and management level.

19 Claims, 15 Drawing Sheets

(56) References Cited

U.S. PATENT DOCUMENTS

| | | |
|---|---|---|
| 7,155,380 B2 | 12/2006 | Hunt |
| 7,210,143 B2 | 4/2007 | Or |
| 7,478,097 B2 | 1/2009 | Emeis |
| 7,657,545 B2 | 2/2010 | Bird |
| 7,689,676 B2 * | 3/2010 | Vinberg et al. ............... 709/220 |
| 7,926,029 B1 * | 4/2011 | Stoyen et al. ................. 717/117 |
| 2003/0037327 A1 | 2/2003 | Cicciarelli |
| 2004/0210623 A1 | 10/2004 | Hydrie |
| 2006/0123414 A1 | 6/2006 | Fors |
| 2006/0184926 A1 * | 8/2006 | Or et al. ........................ 717/168 |
| 2006/0248522 A1 * | 11/2006 | Lakshminarayanan et al. ............................ 717/174 |
| 2007/0136788 A1 | 6/2007 | Monahan |
| 2007/0240154 A1 * | 10/2007 | Gerzymisch et al. ......... 717/174 |
| 2008/0263511 A1 * | 10/2008 | Shapiro ......................... 717/104 |
| 2013/0104133 A1 * | 4/2013 | Keller et al. .................. 718/102 |

OTHER PUBLICATIONS

International search report of PCT/IL08/00947 dated Jan. 30, 2009.
European Search report for corresponding European application, dated Apr. 7, 2011.

\* cited by examiner

Figure 4 (con't)
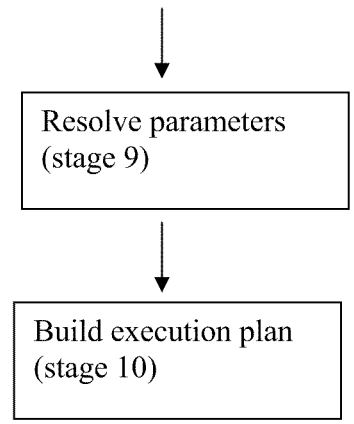

SYSTEM AND METHOD FOR APPLICATION PROCESS AUTOMATION OVER A COMPUTER NETWORK

This application is a national phase of, and claims priority from, PCT Application No. PCT/IL2008/000947, filed on Jul. 9, 2008, which claims priority from U.S. Provisional Application No. 60/929,677, filed on Jul. 9, 2007, all of which are hereby incorporated by reference as if fully set forth herein.

FIELD OF THE INVENTION

The present invention relates to a system and a method for application process automation over a computer network, and in particular, to such a system and method which enable automated processes to be centrally controlled.

BACKGROUND OF THE INVENTION

Computer-based networks, in particular the Internet, have expanded the possibilities for operation of software. Rather than restricting the operation of such software to a single computer, a multi-tier architecture has become popular. Multi-tier architecture (often referred to as n-tier architecture) is a client-server architecture in which an application is executed by more than one distinct software agent. For example, an application that uses middleware to service data requests between a user and a database employs multi-tier architecture. The most widespread use of "multi-tier architecture" refers to three-tier architecture. Three-tier is a client-server architecture in which the user interface, functional process logic ("business rules"), computer data storage and data access are developed and maintained as independent modules, most often on separate platforms. The three-tier architecture is intended to allow any of the three tiers to be upgraded or replaced independently as requirements or technology change. For example, a change of functionality in the presentation tier may only affect the user interface code. Typically, the user interface runs on a desktop PC or workstation and uses a standard graphical user interface, such as an Internet Browser, functional process logic may consist of one or more separate modules running on a workstation or application server, and an RDBMS on a database server or mainframe contains the computer data storage logic. The 3-Tier architecture has the following three tiers:

Presentation Tier

This is the top most level of the application. The presentation tier displays information related to GUI (graphical user interface) services. For example, for an e-commerce application, this tier relates to such services as browsing merchandise, purchasing, and shopping cart contents. It communicates with other tiers by outputting results to the browser/client tier and all other tiers in the network.

Application Tier

The logic tier is separable from the presentation tier and, as its own layer, it controls an application's functionality by performing detailed processing.

Data Tier

This tier consists of services for providing data, as well as hardware such as Database Servers. Here information is stored and retrieved. This tier keeps data neutral and independent from application servers or business logic. Giving data its own tier also improves scalability and performance.

Multi-tier applications are usually divided into modules that are typically distributed between the tiers. Each tier might be implemented by several servers. The modules communicate with each other in order, for example, to exchange data or for synchronize activities. These complicated applications are hard to deploy, maintain and operate. The operators, who maintain the system, have to be assisted by specialized individuals who understand the application. Therefore, maintaining, upgrading, deploying and implementing such applications have become a cumbersome and time consuming process.

Currently there are no fully automated, centrally controlled solutions to this problem. Instead, currently available solutions rely upon manual execution of at least a part of the process, such that a complicated plan for managing such an application must be prepared and performed by highly skilled computer software programmers, significantly raising the cost and complexity of the deployment of new software. Currently there are no fully automated, centrally controlled solutions for controlling and monitoring the activation software.

The situation is further complicated by the recent move in many organizations to SaaS (Software as a Service) and Web Applications, in which a software application is delivered as a service through the Internet (typically through the Web). The deployment and management of SaaS and Web Applications operation is highly complex, dynamic and expensive. Furthermore, for such software deployments, the data center is an important part of the business organization, thereby increasing the requirement for manageable and faultless deployment.

SUMMARY OF THE INVENTION

There is an unmet need for, and it would be highly useful to have, a system and a method for process automation of multi tier applications in a computer network having a plurality of computers.

There is also an unmet need for, and it would be highly useful to have, a system and a method for such application process automation in which a plurality of application components on a plurality of computers have inter-connected functionality.

There is also an unmet need for, and it would be highly useful to have, a system and a method which enables a person who is not specialized in the application to invoke the automated process on a plurality of environments.

The present invention overcomes these drawbacks of the background art by providing a system and method for process automation of one or more applications in a computer network having a plurality of computers, in which the one or more application components are preferably interdependent, and optionally and more preferably hierarchical, in terms of their operation.

The present invention overcomes the difficulties of the operator to invoke the automated process by preferably having two design phases in at least some embodiments. In the first phase the user, who is preferably a person that is specialized in the application, designs a plurality, and more preferably all, of the possible processes and modulates them into the relevant logical components. Such a process may optionally, for example, install certain software or monitor a certain activity. Such logical components may optionally include but are not limited to for example web-based services or a Data Base. The output of this phase is preferably used by the operator who maps the logical components into the actual environment, for example into the specific enterprise or Data Center. This phase optionally maps each logical component into at least one physical server and each logical connection between components into a physical network.

The present invention overcomes the difficulty of application process automation in a distributed environment by preferably providing, in at least some embodiments, a distributed architecture in which each application component can communicate with the other application components regardless of their physical location. This architecture is described in more details in the drawings provided herein and their accompanying description.

Among the many benefits of the present invention and without wishing to be limited by a single list, the present invention may provide at least the automated deployment and life cycle maintenance of such applications.

Most preferably, the software features a plurality of components on a plurality of computers which have inter-connected functionality, with regard to the process automation order for at least one of the applications.

The application process automation is preferably controlled at a management server, such that one or more users may more preferably adjust the process or at least optionally view the progress via one or more consoles which are preferably in communication with such a management server. Such consoles and management server preferably enable the software product to be managed, verified, monitored and tracked from a single location. More preferably, the system and method provide management reports for the user (who may for example optionally be a software professional and/or deployment professional) and management level.

Each controlled device optionally features an agent which operates according to the application process automation plan, which is more preferably at least partially pre-determined (for example by the previously described expert in the application design) but then adjusted for a particular computer network configuration.

Optionally and preferably, the management server controls one or a plurality of execution servers for invoking the automation process on the computer network. Each execution server is preferably responsible for managing and controlling at least one agent.

Optionally and preferably, the management server controls one or a plurality of execution servers for process automation on the computer network. Each execution server is preferably responsible for controlling and managing at least one agent.

According to preferred embodiments of the present invention, the system and method feature the following functions: planning, and more preferably visual planning, for defining the first phase of the design which includes the defining of the product architecture, prerequisites, configuration settings, actions, and scripts; verification processes for determining the verifications for each component and global system operation, which are defined in advance; advanced definition of flow and dependencies for determining manufacturer definitions and limitations for the relations between the various product components.

According to other preferred embodiments of the present invention, the system and method may optionally be implemented for operation in a distributed manner and/or from a single computer on the computer network, which does not need to be a server or dedicated computer. Instead, the present invention preferably has a flexible implementation.

Among the many benefits of the present invention and without wishing to be limited by a single list, the present invention may provide at least the following benefits in at least some embodiments:

Automates complex deployments and multi-tier deployments;
Automates maintenance activities on the deployed software
Automates control activities on the deployed software
Automates support activities on the deployed software
Automates disaster recovery activities on the deployed software
Replaces manual operations;
Bridges gap between application teams and operation teams;
Verifies application functionality after deployment;
Reduces Data Center deployment errors and costs and;
Perform maintenance activity on the application
Executing jobs or commands on the computers on which the agents are installed U.S. Pat. No. 7,152,109 B2 (filed Apr. 21, 2001, issued Dec. 19, 2006) teaches a method for automated provisioning of computer networks comprising a plurality of customer accounts, wherein each customer is assigned to an individual virtual local area network (VLAN), and wherein the customer accounts relate to specific customer hardware devices contained on the network, and specific customer software applications deployed by way of the computer network. This patent, as opposed to the present invention does not teach how to perform a multitier application process automation in which each component of software optionally communicates with another component which may or may not reside on the same computer. This patent, as opposed to the present invention, does not teach how to maintain the life cycle of such software and it is also focused on customer accounts wherein each customer is assigned to an individual virtual local area network while the present invention is not related to accounts and is also not limited to VLANS. The present invention can be implemented on a combination of several networks.

US Patent Application 20040210623 (Filed Mar. 6, 2003, Published Oct. 21, 2004) deals with building a virtual network topology for the distributed application on a physical distributed computing system without reconfiguring physical connections of the distributed computing system and with automatically and remotely deploying the distributed application on a physical distributed computing system comprised of multiple computers and network switches according to the virtual network topology. However this application, as opposed to the present invention, does not deal with life cycle maintenance of the application. This application is based on VLAN technology while the present invention can be implemented on a combination of several networks.

US Patent Application 2006-0123414A1 (filed Dec. 3, 2004, published Jun. 8, 2006) deals with an install factory that creates install packages used to install complex applications onto multiple data processing systems in a reliable and reproducible manner. This application, as opposed to the present invention, does not deal with life cycle maintenance of the application. In addition, the present invention provides the communication between the application components regardless of their physical location. Thus in the present invention the application can communicate with each other, whether they are installed on the same computer or on different computers, and with the management server during the process of the deployment and in the maintenance phase.

U.S. Pat. No. 7,124,289B1 (filed Oct. 31, 200, issued Oct. 17, 2006) relates to a framework for automatically provisioning computing devices. The taught invention includes a central database system and a central file system. Information stored in the database comprises a model of the individual devices, as well as the interconnections of the devices. The central file system stores the software components to be installed on the devices. When provisioning is carried out, the database sends commands to agents located on each device which cause them to retrieve and install the software components from the file system, and to configure the components according to the stored model. This patent, as opposed to the present invention, does not at all handle life cycle maintenance of the application. In addition, the present invention provides the communication between the application components regardless of their physical location. Thus in the present invention the application can communicate with each other, whether they are installed on the same computer or on different computers, and with the management server during the process of the deployment and in the maintenance phase.

U.S. Pat. No. 7,210,143 (filed on Mar. 4, 2003, issued on Apr. 24, 2007) relates to an application model for automating deployment of an application. In one embodiment, the application model includes a static description of the application and a run-time description of the application. Deployment phases, such as installation, configuration and activation of the application are executed according to the application model. This patent, as opposed to the present invention, does not deal with life cycle maintenance of the application. In addition, the present invention provides communication between the application components regardless of their physical location. Thus in the present invention the applications or application components can communicate with each other, whether they are installed on the same computer or on different computers, and with the management server during the process of the deployment and in the maintenance phase.

US Patent Application No. 20030037327A (filed Aug. 15, 2001, published Feb. 20, 2003) relates to methods, systems, and computer program products for improving installation of software suites by automatically and dynamically obtaining information pertaining to the heterogeneous run-time environment in which the suite will be installed, and using this information as input to a rules engine which evaluates rules to dynamically select a predetermined topology-specific configuration of the suite. As opposed to the present invention which enables the deployment of multitier applications on many computers, this patent application suggests a solution for a stand-alone computer only and cannot support communication between multiple computers.

Unless otherwise defined, all technical and scientific terms used herein have the same meaning as commonly understood by one of ordinary skill in the art to which this invention belongs. The materials, methods, and examples provided herein are illustrative only and not intended to be limiting. Implementation of the method and system of the present invention involves performing or completing certain selected tasks or stages manually, automatically, or a combination thereof. Moreover, according to actual instrumentation and equipment of preferred embodiments of the method and system of the present invention, several selected stages could be implemented by hardware or by software on any operating system of any firmware or a combination thereof.

For example, as hardware, selected stages of the invention could be implemented as a chip or a circuit. As software, selected stages of the invention could be implemented as a plurality of software instructions being executed by a computer using any suitable operating system. In any case, selected stages of the method and system of the invention could be described as being performed by a data processor, such as a computing platform for executing a plurality of instructions.

The application optionally uses third party software which provides flexible security solution for enterprise software, for increasing runtime performance, for creating peer-to-peer (P2P) applications, for enabling the development of persistent classes following object-oriented idiom and for any other purposes. This third party software can optionally be replaced by proprietary software and is not an essential part for the invention.

Although the present invention is described with regard to a "computer" on a "computer network", it should be noted that optionally any device featuring a data processor and/or the ability to execute one or more instructions may be described as a computer, including but not limited to a PC (personal computer), a server, a minicomputer, a cellular telephone, a smart phone, a PDA (personal data assistant), a pager, TV decoder, game console, digital music player, ATM (machine for dispensing cash), POS credit card terminal (point of sale), electronic cash register. Any two or more of such devices in communication with each other, and/or any computer in communication with any other computer may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A is a schematic block diagram of an exemplary system and process according to the present invention while

DESCRIPTION OF THE PREFERRED EMBODIMENTS

Figure 1A:
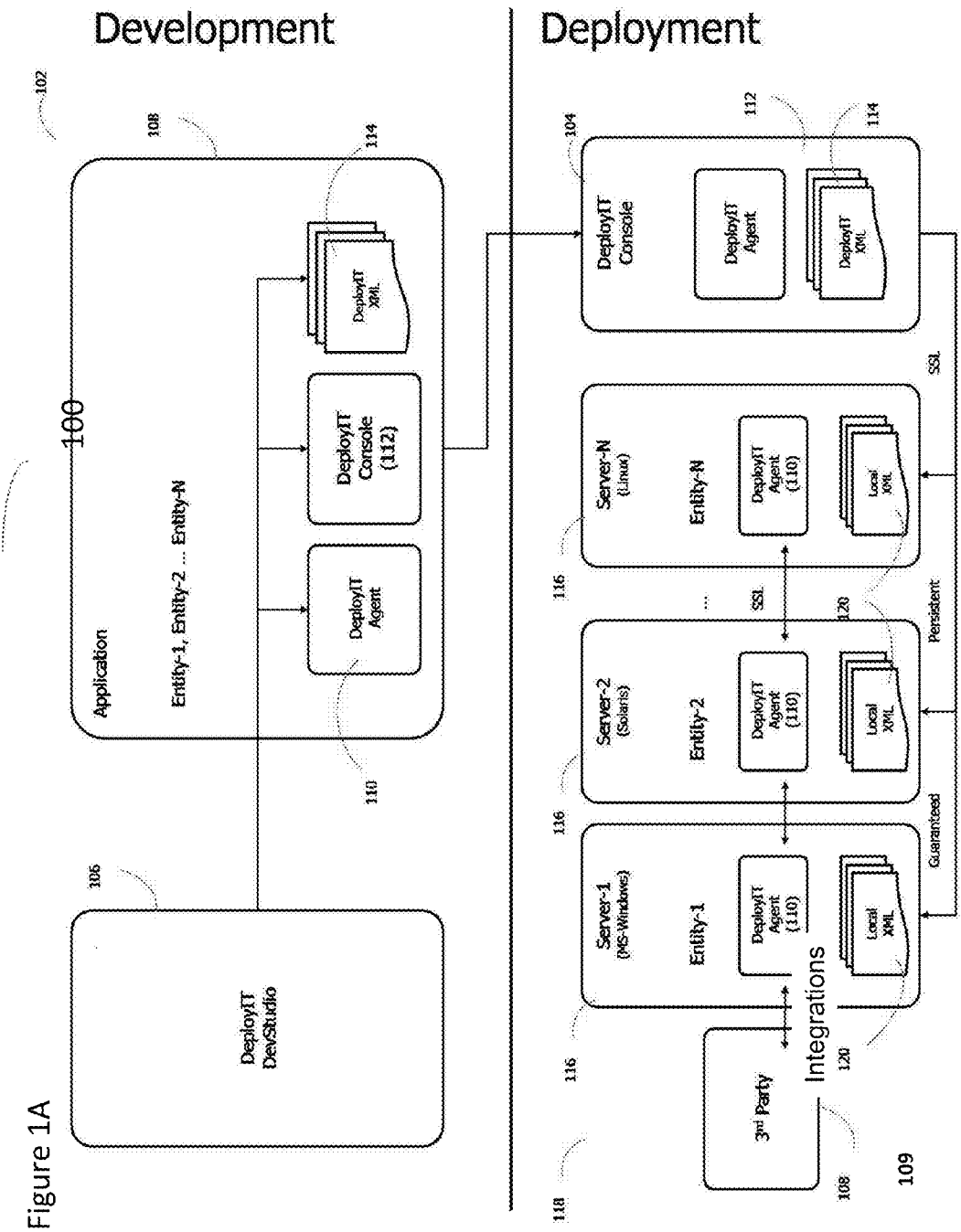

The present invention is of a system and a method for application process automation of software on a computer network featuring a plurality of computers, preferably including at least the partially automatic determination of a plan for application process automation.

The present invention provides at least two design phases. The first phase is the application design phase in which the application automated processes are defined, bundled and assigned to specific logical components such as web server, application server, data base server and the like. The automated processes are optionally and preferably build from atomic operations such as create folder, or copy folder, which are preferably combined into more complicated processes by using the devstudio. This phase optionally and preferably defines the connections between the processes. This phase is preferably implemented with the help of the devstudio. The second phase is optionally and preferably implemented with the help of the console. This phase preferably defines the physical environment by, for example assigning a real server to logical component, or by assigning real addresses. This phase is based on the package which is the output of the first phase.

The present invention preferably provides an architecture in which the application design phase is independent from the operational design phase, and thus enables the operator to adjust the application process automation to different environment without being required to deeply understand the application.

The present invention preferably provides, in at least some embodiments, support for a distributed architecture in which each process can communicate with the other processes regardless of its physical location. This architecture is described in more details in the drawings provided herein and their accompanying description.

According to preferred embodiments of the present invention, the system and method bridge the gap between development teams and operation teams of a software application, through modeling of the software application (also referred to herein as the target application).

Such modeling preferably includes creating one or more appropriate software architectures according to the requirement(s) of the computer network and/or the requirements of the automated application processes.

According to some embodiments the system of the present invention comprises a DevStudio (development studio) module for defining and modeling of the application processes in an automated manner. This module preferably enables a plurality of constraints to be set according to the selected architecture, for example, quantity and ratio constraints. The process of modeling in the DevStudio preferably uses these constraints for the selected architecture. Optionally and preferably, the DevStudio module performs one or more of defining the logical components, collecting information about the Steps to be performed for each logical component, defining the architectures for the target applications, and/or defining the flows and processes for each architecture.

The DevStudio module preferably includes a conflict detection mechanism which detects problems that may or do arise during the automated flow or process execution. Optionally and more preferably the conflict detector builds a data structure for storing and optionally displaying the problems (conflicts) with descriptive labels, thereby enabling the user to understand their main causes.

Such conflicts may arise if a user does not notice that the flow at some point has some error or failure and/or that the flow might cause failure during the actual execution of the processes. Non-limiting examples of such conflicts include that the flow does not end because of a (non-ending) cycle in the flow; the flow does not end because of a missing value or a parameter that does not have a value; a parameter can have an undetermined value if updated in more than one way on more than one Action at the same time (race condition); Action A uses output of another Action B which in its turn waits for Action A's output (cycle through parameters); a file path that the user previously selected does not exist any more or not accessible; some Action lacks compulsory input (e.g. Action that copies a file lacks value for input which designates the exact file that should be copied). These conflicts are preferably prevented during the modeling stage by checking the effect of architecture selection and topography modeling, and more preferably by also checking the effects of one or more user actions.

Once the first phase of the design ends, the user (operator) preferably maps the logical servers to physical servers via the console in order to determine a map. The mapping is preferably done via the console. After the mapping process, the user may optionally and preferably select the option to examine each component defined in the DevStudio in a pre-deployment process. This type of pre-check process could optionally be performed before the user decided to run the automated process on the target application (for example as a separate process). If the process shows that the automation process has been correctly mapped, then the output is preferably distributed to the relevant execution servers for activation by the agents for whom these servers are responsible. Preferably the results from each pre-deployment check in each execution server on each computer are stored, for example on the management server log.

The automated process is preferably centrally controlled and is more preferably implemented through a plurality of execution servers and agents for deploying the software on the computer network. The agents preferably operate according to the pre-defined plan, which is more preferably at least partially determined before deployment but then adjusted for a particular computer network configuration.

According to preferred embodiments of the present invention, a management server, which can be access by one or plurality of consoles, for monitoring and controlling the automated application processes is provided, such that one or more users may more preferably adjust the deployment or maintenance (or any other application process), or at least optionally view deployment progress. Such management server preferably enables the software product to be deployed, managed, verified, monitored and tracked from a single location, using the console. As previously noted, the management server may optionally be operated by a single computer on the computer network, which does not need to be a server or dedicated computer. Instead, the present invention preferably has a flexible implementation.

The management server optionally and preferably controls the performance of the Modeling, Monitoring and Control of the automation process, for example for deploying the application preferably by using the predefined plan. The process then preferably manages the adjustment of the plan for a specific configuration and environment, which preferably includes but is not limited to one or more of distribution of local plans to the execution servers; distribution of application files and parameters to the execution servers; initialization of the flow execution; providing status information to the management server; and storing the result information.

Preferably, the operation of the management server for operation of the modeling portion of the Modeling Monitoring and Control process is as follows (although it should be understood that this description is given for the purpose of illustration only and that other implementations are contemplated within the scope of the present invention). The modeling process preferably starts when the user selects the architecture needed for the specific automation process (for example deployment) through the console which communicates with the management server. The user then enters the required one or more inputs, and adjusts the deployment map to reflect the actual deployment requirements. The map forms part of the deployment plan. When the user chooses to start the process, the plan is preferably divided into a plurality of local plans, with each local plan preferably being provided to an execution server, which then passes the relevant portions of the plan to the agents. The agents, upon receiving the plan and/or upon receipt of a trigger after receiving the plan, start the local execution. During execution, each agent reports to the execution server which controls this agent and each execution server preferably reports to the management server.

The execution control process receives the status reported by each execution server and preferably forwards the status to the management server. This information can be shown on the console. Each status report may optionally include one or more missing data items and/or parameters required for the execution server to complete or optionally even continue deployment. Each missing user input required by an execution server is preferably handled by the control process and forwarded to the management server for displaying the request to the user. Once the user inputs a response, the control process preferably sends the response back to the relevant execution server, for example to continue the deployment flow.

According to other preferred embodiments of the present invention, a plurality of agents is installed at a plurality of computers on the computer network. The agents are optionally and preferably automatically distributed to at least a portion, but more preferably all, of the computers on the network which participate in the deployment of the target application. Once the agents are installed they preferably discover each other automatically and locate the execution server and/or the management server automatically as well. The agents are optionally installed via the execution servers or through any other mechanism, or even manually. The agents communicate with the management server via the execution server. These agents accept the previously described plans and also, in the case of deployment, preferably accept application packages (software to be deployed). The agents automatically run the processes, requesting user inputs as required during execution. Also the agents may optionally wait as some tasks might require other conditions to be fulfilled. These conditions may optionally be required to occur on the same computer or on a different computer. Parameters may optionally be shared between different computers through the execution servers.

Agents preferably receive commands (interrupts) while executing the processes and also preferably operate in parallel as much as possible; also tasks within the agents should work in parallel (again as much as possible). Preferably the status of the process is visible at any time, for example by sending status information to the management server to be shown by the console.

According to still other optional embodiments of the present invention, the system and method may also optionally be used for more limited software deployments, such as for example deploying upgrades and patches to previously installed software, or any other ad hoc software installation or deployment process.

According to still other optional embodiments of the present invention, the system and method may also optionally be used for release management, which bridges development and deployment through control of the process of releasing new software applications and/or upgrades or other incremental software packages to a computer network or networks. Such release management is also preferably used for implementations such as SaaS and other types of software implementations. In each case, preferably the execution server is used for release management and for coordinating deployment. For example, in order to upgrade the computer network for customers having different levels of service, such that each upgrade is run separately, the upgrade is preferably deployed once for the each of the execution servers but then performed separately for each computer network agents.

According to still other optional embodiments of the present invention, the system and method may also optionally be used for software maintenance, software control, disaster recovery and support.

Currently there is no solution for controlling the access of application users to automated application processes or services, not by their role or any other means to identify their access level or authority for modeling, viewing, controlling or executing application architecture and/or automated processes or services.

The present invention, in at least some embodiments, provides means to let any form of operators of the application and/or its automated processes or services to control the access of users to model, view, control or execute the automation of the application processes or services. This access control may optionally be user based, role based or any other way of distinguishing the required authority of access to the application processes or services.

The present invention is also useful for ITG (IT governance), which involves the management of IT processes in an organization, preferably including at least one "sign off" by at least one individual having signing authority within an organization, such that without such a "sign off" at least a portion of the deployment process cannot proceed.

Although the above description relates to software deployment, it should be noted that this is an illustrative example only and is not meant to be limiting in any way. The above processes may also optionally be performed for software maintenance and upgrades, for example.

It should also be noted that the above description may also optionally and preferably relate to application service automation, in which one or more automated processes are performed to support an application (for example with regard to deployment, installation of an upgrade and maintenance, or the like). Without wishing to be limited by a single hypothesis, the present invention (in some embodiments) is effective for such automation with regard to an application comprising a plurality of interdependent components in a computer network having a plurality of computers, by supporting automatic construction of a process for execution of a service for the plurality of interdependent components by the plurality of computers. For the above described types of service, the components of the application need to participate in an orchestrated manner as determined by the automated process.

The principles and operation of the present invention may be better understood with reference to the drawings and the accompanying description.

Referring now to the drawings, FIG. 1A is a schematic block diagram of an exemplary system according to the present invention. As shown, a system 100 may optionally and preferably be divided into two parts which reflect the two design phases: a first development part 102 and a second operation part 104. Development part 102 preferably features a DevStudio 106, which is preferably used to develop a generic model which more preferably is used to at least partially determine an automation plan, as explained in greater detail below. DevStudio 106 preferably models the application process automation, in conjunction with a particular software application 108. Software application 108 is optionally and preferably designed for operation by and with a plurality of different computers on a computer network, shown as "entities", which may also optionally be termed application components. The generic model optionally and preferably includes the knowledge about the entities, the workflows, and the software application architecture.

DevStudio 106 preferably also is used to package application automation knowledge 114 which may then preferably be used by a management server console 112. Application automation knowledge 114 preferably includes binary and the application files needed for the deployment. The latter are preferably implemented in XML as shown. Execution server (not shown, please see FIG. 8), management server (not shown, please see FIG. 8) and application automation knowledge 114 are tools for operation during the second operation part 104.

Application automation knowledge 114 preferably includes actions for the entities and a plan for determining the flow of operations during automation phase, as well as different architectures for the target software application. Preferably, through management server console 112, the user is able to select a particular architecture for software application 108 which is most suitable for the target environment needs, and is preferably also able to model the selected architecture to meet the application needs. This modeling process includes selecting and/or alternatively or additionally automatically determining logical computers, more preferably logical servers, along with the function(s) required for such logical computers/servers.

Once the required architecture and target application structure have been selected, the user is preferably able to select the available computational devices or entities on the computer network and to map the logical servers to the actual physical computers 116 on the network. More preferably, during the operation environment modeling the user indicates which computational devices or functionality are to be added, while optionally and most preferably one or more constraints are preferably considered in order to determine whether one or more additional computational devices should be added to the map as well (for example, a constraint may require that for each database, a report server is also deployed; once the user has selected to add a database, the report server is preferably added automatically). The map preferably maps the logical components into physical servers. Constraints are discussed in greater detail below.

The output of the operations of DevStudio 106 is preferably combined with the operations of management server (not shown; please see FIG. 8) to combine the model of the software application with the model of the operations in order to determine the overall automation plan and also the overall map. Next, the management server (not shown; please see FIG. 8) preferably determines the local plans to be performed by a plurality of agents 110, described in greater detail below, again, more preferably according to information received from DevStudio 106 as described herein. Execution server(s) (not shown) are preferably used to distribute the local plans to the agents 110. The plan itself optionally and preferably includes a description of the component entities and their properties, along with configuration requirements. One or more actions to be performed may also optionally be included, such as, in a deployment process, rollback for example, which is an "uninstall" or other opposite action to deployment (as opposed to mere software removal). Such a process is optionally performed if the software deployment process becomes problematic and/or ceases to be properly implemented; the deployment process can be "rolled back" or returned to the last point in the process during which implementation was correct. The automation workflow is also preferably described.

For operation part 104, the management server (not shown) preferably operates to control process through a plurality of agents 110. As shown each agent 110 is preferably installed and/or optionally alternatively or additionally automatically distributed by management server at a computer 116 (such that each computer 116 optionally forms an entity) on a computer network 118. One or more computers 116 may optionally be a server for example and preferably receives a portion of application 108 for deployment, such as one or more software components for example. The management server (not shown; please see FIG. 8) preferably also provides a plurality of local plans 120, derived from application automation knowledge 114 (which is the global automation plan) and the operation modeling (which creates local automation plans 120 for agents 110). Automation is preferably performed by agents 110 according to local plans 120, with interaction with and instructions from management server (not shown; please see FIG. 8).

The management server may optionally be implemented as a lab server, for example to permit multiple application automation processes to be controlled at a single point (optionally with different configurations or architectures) and/or to permit a plurality of different users or groups to interact with management server through management server console 112.

DevStudio 106 may also optionally be implemented in a server form, for example if a plurality of individuals or groups in an organization are developing or otherwise working on software application 108.

Figure 1B:
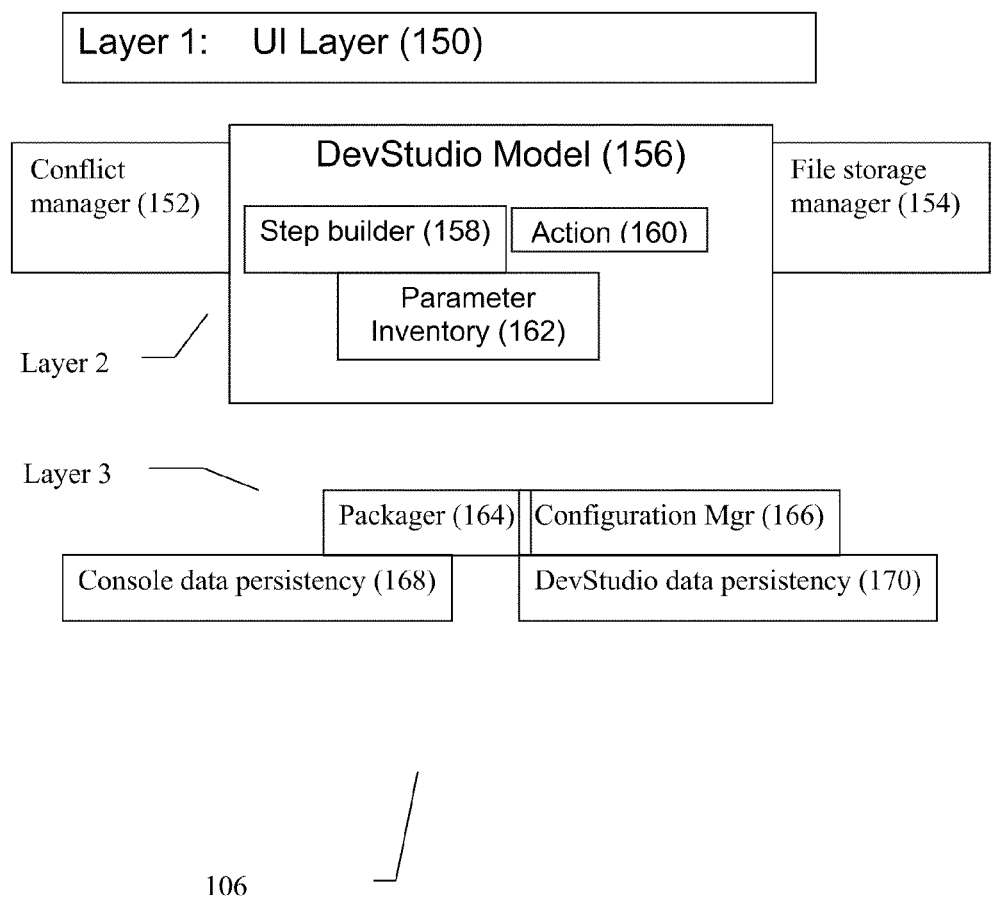
FIG. 1B shows an exemplary, illustrative implementation for DevStudio 106.

FIG. 1B shows an exemplary, illustrative implementation for DevStudio 106. As shown, DevStudio 106 preferably has three layers. A first layer preferably includes a UI (user interface) 150 for interacting with the user and for receiving input as described above. A second layer preferably includes a conflict detection manager 152, described in greater detail below, along with a file storage manager 154 (for storing file(s) of software application 108). The second layer also preferably includes a DevStudio Model 156, which optionally and more preferably supports UI 150 and enables creation (and more preferably manipulation) of: parameters for the deployment process, the steps (and optionally complex steps, as described in greater detail below), one or more required components and optionally one or more logical servers (computers on the network), one or more architectures, and one or more applications. For the purpose of description only and without wishing to be limiting, it should be noted that a logical server is being mapped to a real server in management server (not shown; please see FIG. 8) after the modeling of the architecture (the modeling is preferably performed on logical servers). DevStudio Model 156 preferably also enables selection and optionally manipulation of architectures and one or more software applications. DevStudio Model 156 optionally and preferably includes a step builder 158 for building the steps for the execution flow (see below for a more detailed description of steps and execution flow), one or more actions 160 to be performed during the execution of each step and a parameter inventory 162 for selecting parameters to prepare the created and/or manipulated parameters as described above.

DevStudio Model 156 optionally and more preferably records the dependencies of various entities for the deployment process, and optionally and most preferably enables and performs verifications of the steps and/or actions and/or pre-deployment verification of one or more aspects of the deployment plan. DevStudio Model 156 optionally and more preferably records the relationship between steps and parameters, and also more preferably records steps from which components are used in or by a specific logical server or other logical device (not shown).

The model itself (developed by DevStudio Model 156) preferably includes a plurality of data structures, including but not limited to a data structure for parameters, a data structure for available steps and a data structure for applications, components, logical servers and Architectures.

The third layer optionally and preferably includes a packager 164 for packaging the model and data structures in a format for later use by management server (not shown; please see FIG. 8). A configuration manager 166 provides inputs and information for different architectural requirements and configurations. Data persistence is handled by a console data persistency model 168 for the management server and by a DevStudio persistency model 170 for DevStudio 106.

According to preferred embodiments of the present invention, conflict detection manager 152 preferably detects problems that may arise during deployment flow execution. In addition conflict detection manager 152 can preferably build a data structure which may be used later in order to display the problems (conflicts) with descriptive labels and show their main causes (for example through UI 150). Some non-limiting examples of the conflicts handled by conflict manager 152 are described in greater detail below. These conflicts are preferably prevented during the modeling stage by checking the effect of architecture selection and topography modeling, and more preferably by also checking the effects of one or more user actions.

According to some preferred embodiments of the present invention, conflict manager 152 optionally and preferably performs two different types of conflict checking: on going checks and on demand checks.

On going checks are preferably performed at times when they do not interfere with the modeling process, for example when they do not require excessive time and CPU cycles. Preferably such on going checks include one or more checks for flow circularity, to make certain that the flow does not have cycles. Such checks may optionally be performed by using a graph to look for the connection between steps, for example each time that the user attempts to create a link between two steps.

On demand checks preferably require an additional graph which holds all of the dependencies in one data structure. This enables an overall efficient analysis of the flow. As noted above the model of the flow is optionally and preferably held in a plurality of different data structures (Steps, Parameters and Files) and so does not readily lend itself to this kind of analysis.

According to some embodiments of the present invention, a dependencies graph is created by linking steps that have a parent/child connection and also by linking steps that use parameters of other steps.

The method of creating the graph is preferably performed as follows. Starting from the first step, and then proceeding to other steps through the parent/child link, at each step the required parameters are analyzed, as well as those parameter(s) which are updated by this step. For every Step that is processed, a node is created in the dependency graph. For each parent/child link, a directed link of type is created, from the node that represents the parent Step (source of the link) to the node that represents the child Step (target of the link). Thus each target node cannot be executed before the source node. In same way a link of type II is created for each step and its sub-flow Step (sub-flow step is the target of the link).

During this process, the compulsory inputs are checked and if there is any lacking compulsory input, the Step and the input are preferably recorded for future display to the user.

After this process of reviewing the steps, if there aren't any problems, then links of type III are created, which are parameter links. Again each step is reviewed for each parameter that it uses according to the following process. If the parameter is updated by some other Step, link of type III in dependency graph is created (the source of the link is a node that represents the updating Step and the target is a consuming step).

If the parameter is updated by more than one step, it is determined whether those steps can be executed at the same time, preferably by checking pre-evaluators of those steps. If they have same type of pre-evaluators with same conditions, then the parameter can potentially have an undetermined value if these Steps are run in parallel. The parameters are recorded in order to be able to warn the user about the potential undetermined parameter value at runtime.

If Step uses a parameter that is not updated and does not have predefined value and cannot be deployed through the deployment console (i.e. by the user during the deployment process), then it is determined that the Step uses a parameter without value and the parameter is recorded for future display.

Next, if no problems have been found, inconsistency of parameter consumption order is considered, such that parameters are provided/updated in a manner which could lead to a conflict. This is preferably performed by unmarking all incoming links of types I, II and III in all nodes; putting the first node in queue Q1. Next each node is removed from the queue Q1 and examined. If the node has outgoing links of type III and they are not marked in target nodes, those links are marked in the target nodes, node.count is set to be the number of outgoing links of type III and the node is put into queue Q2. The number node.count is passed to all target nodes of links of type III. For all target nodes that were marked: if all incoming links of the node are marked put the node in queue Q1.

Otherwise, if links of type III do not exist or already are marked, for every link of type I and type II mark the links in target nodes. If there is a node.count that was passed, increase it by number of links of type I. Pass the node.count to all target nodes of links of type I. For all target nodes that were marked, if marked node has all of its incoming links marked put the node in queue Q1.

After all links have been handled and there is a node.count that was passed decrease it by 1. If node.count equals 0, remove the node that owns the node count from queue Q2 and put it to Q1.

If the algorithm ends and there are unprocessed nodes (i.e. nodes with unmarked in-links or nodes in Q2) it means that there is a problem with parameter links ordering. Record every Step that is represented by unprocessed node along with unmarked in-link for future display. (Unmarked in-link is a dependency that could not be satisfied and thus the source node of the link represents Step that may cause the problem).

Figure 2:
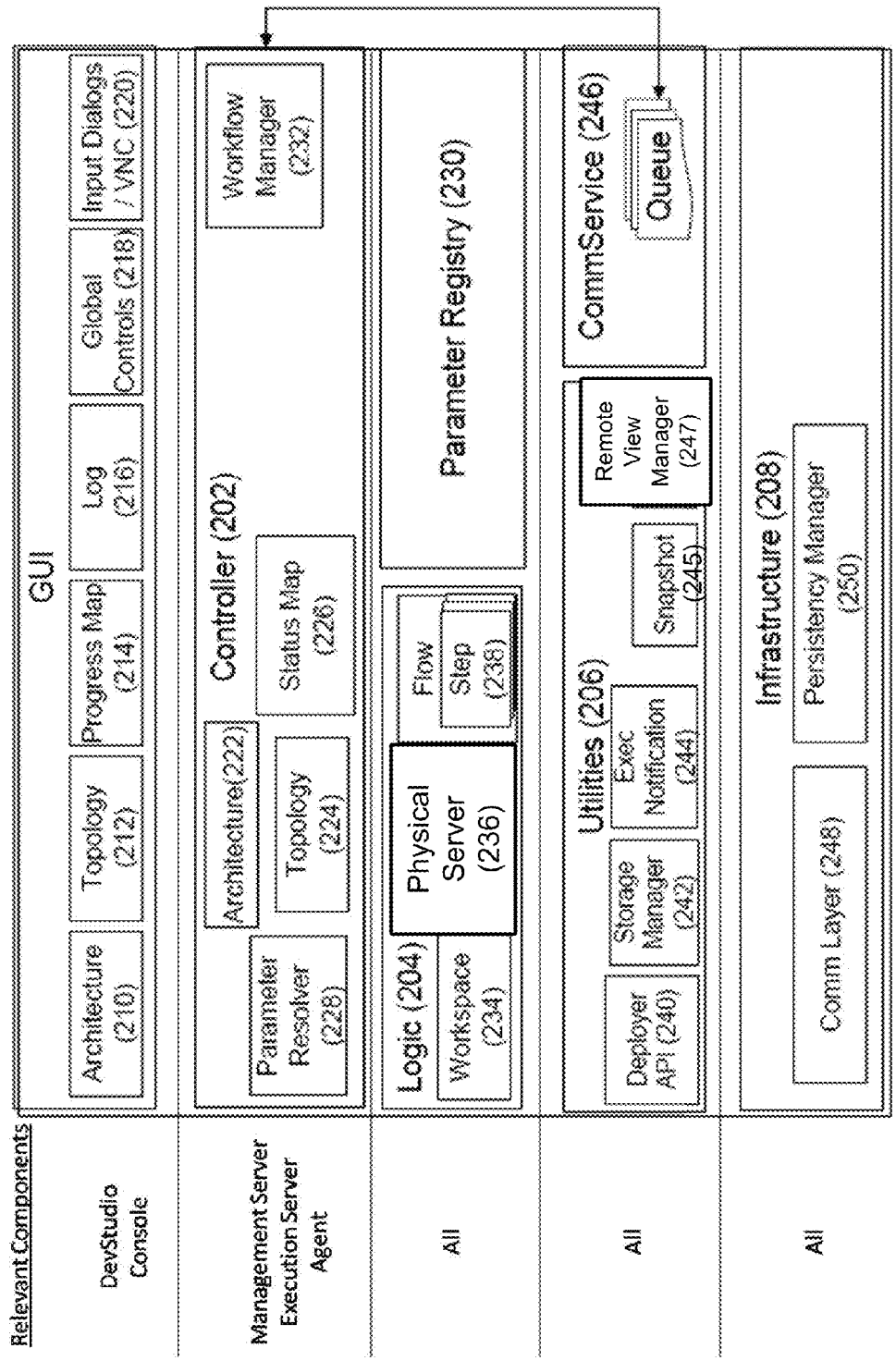
FIG. 2 shows an exemplary, non-limiting illustrative architecture for an embodiment of the software 112.

FIG. 2 shows an exemplary, non-limiting illustrative architecture for an embodiment of the system 100. As shown, this architecture includes a GUI (graphical user interface) layer 200 for supporting an interface with the user (it should be noted that any type of suitable interface may optionally be provided and that a graphical interface itself is optional but not required). The GUI layer optionally resides in the console (not shown); a controller layer 202 for controlling the overall implementation of the Modeling Monitoring and Control process; a logic layer 204 for supporting the overall flow of the process, preferably including any adjustments to the map; a utilities layer 206 for supporting operation of various components of the system; and an infrastructure layer 208 for managing communication between management server (not shown) and the execution servers (not shown; see FIGS. 1 and 3), and persistency issues for all other components of the system.

Turning now to each layer for a more detailed description, GUI (graphical user interface) layer 200 preferably features a plurality of components for supporting communication with the user. These components preferably include an architecture component 210 for recording and modeling the various architectures and structures of the software application whose processes are being automated. A topology component 212 preferably displays information regarding the topology of the computer network on which the automation is being performed (not shown, see FIG. 1), more preferably including a connection between the entities or elements of the software and the computers on the computer network. A progress map 214 preferably enables the user to view the progress of the process, optionally and more preferably at a level of resolution which includes every step that is being performed on each entity. A log 216 preferably stores information regarding the process, for example for analyzing the process status, especially if errors are involved in the process. A global control component 218 preferably enables the user to control the overall automation process, while an input dialog component 220 enables the user to receive requests requiring missing information from the agents, and to supply such missing information to the agents.

Controller layer 202 controls the overall implementation of the Modeling Monitoring and Control process, preferably including control of the automation of the software through architecture control module 222, which returns the list of the different architectures available in the global automation plan to architecture component 210, and topology control module 224, which returns the list of real servers and/or computers on the computer network, and a description of each such computer, to topology component 212. Controller layer 202 also preferably includes a status map 226 for determining the status of the deployment according to information received from the agents and requests inputted by the user, and a parameter resolver 228, which handles requests to a parameter registry 230 (part of logic layer 204) if a value for a parameter is required. Parameter resolver 228 may optionally block further operation of controller layer 202 until the required parameter value is accepted from parameter registry 230.

A workflow manager 232 (shown as part of controller layer 202) preferably accepts the user input requests from the agents, and asks GUI 200 to provide the parameter dialog for the requested parameter to the user. In addition, all the status events accepted from the agents are preferably passed to log component 216. Any user command (Stop, Pause, Resume, Pre-check, Deploy) is preferably handled by workflow manager 232 and passed to all of the agents.

Logic layer 204 supports the overall flow of the deployment/maintenance process, preferably including any adjustments to the map. Logic layer 204 preferably includes a workspace module 234 for hosting a modified map, modified according to one or more user requests. For example, when modeling a selected architecture, the user selects the quantities of computers on the computer network (also termed "logical servers" herein) and modifies the links between different computers. The modified map preferably includes the following objects: a list of all computers, preferably including a list of all of the logical servers to be deployed, each of which includes the pre-requisite checks and the flows to be executed during the automation process; flow for the process which is relevant to execution of the process on a particular architecture; a plurality of execution steps, which more preferably include input values and parameters, output parameters, action objects, and one or more sub-flows if defined; and a plurality of links for controlling the flow execution order, by constructing a graph of dependencies between the steps involved in a flow.

Once the architecture has been selected by the user, logic layer 204 preferably features a physical server 236 (or network or plurality of actual devices) for each logical server and/or server type or server template in the selected architecture. Any adjustments to the selected architecture, in terms of modifying, removing or adding one or more computers are preferably reflected through corresponding changes to physical server 236. Also a flow module 238 preferably handles the flow modifications caused by the deployment/maintenance architecture modeling. When each representation of the physical server 236 is created, the entire flow (including the steps in it) relevant for that physical server 236 is preferably duplicated and all the links between the steps are created accordingly. If the user changes a connection source or destination for a particular physical server 236, meaning that a computer is connected to a new and different computer than in the previous architecture, all of the links between steps in flow module 238 are preferably updated accordingly.

Logic layer 204 also preferably includes parameter registry 230, which as previously described manages the sharing of parameters within and between management server 112 and the agents. Parameter registry 230 uses the queue of a CommService 246 (described with regard to utilities layer 206) to send parameters resolved values to the agents and/or to workflow manager 232. Parameter registry 230 uses a persistency service 250 (described with regard to infrastructure layer 208) to maintain the state and value of the parameters.

The declaration or update of parameters is written in parameter registry 230 during the definition of each step, as described above. If an execution server (not shown) needs a parameter value from the user, it sends a request to management server (not shown). Parameter registry 230 handles such requests, causing management server (not shown) to either open the parameter input dialog or notify the GUI for open input dialog, and when the user sets the required values, parameter registry 230 is updated, and a response is sent back to the execution server's parameter registry 230 (described in greater detail below).

Utilities layer 206 supports operation of various components of management server (not shown). Utilities layer 206 preferably includes an execution server API 240, which handles communications between the execution servers (not shown) and management server (not shown please see FIG. 8). Any request from the agent is preferably represented by the API 240.

A StorageManager 242 preferably manages all application files that are needed for the automation process, including without limitation deployment files (in the case of deployment), DB scripts etc. StorageManager 242 also takes part in application files distribution to the agents (not shown).

An Exec Notification 244 is a listener object allocated by the Modeling Monitoring and Control process when a process starts in an agent (not shown). Exec Notification 244 preferably receives all of the status events from the execution server and passes them over to log component 216 and progress map 214 to display an online status of the deployment workflow.

Snapshot 245 is preferably used to make a record of the deployment process with regard to the deployment map, topology map, log, deployment status, and parameters, in order to permit a rollback to be performed if necessary or send the snapshot back to the support organization or professional services to shorten problem resolution. Remote View Manager 247 preferably provides direct remote control to each computer from the system 112, optionally also including a record of all operations done remotely in each computer, and stored in the log.

CommService 246 preferably communicates with workflow manager 232 as shown, in order to manage the communication between management server (not shown) and the execution server (not shown). CommService 246 maintains a queue for messages to management server (not shown) accepted from the execution servers (not shown).

Infrastructure layer 208 manages communication between management server (not shown) and the execution server (not shown), and features a CommLayer 248, which is a peer-to-peer bus that handles all communications between the execution servers (not shown) and management server (not shown). CommLayer 248 preferably handles one or more of durability; persistency; secured channels; self healing of peers and channels (in which CommLayer 248 for example saves messages for a execution server that temporarily cannot accept such messages; once the execution server (not shown) is able to reconnect, CommLayer 248 sends these messages to the execution server (not shown); crossing firewalls for the deployment/maintenance process; and protocols and port allocation for the deployment/maintenance process.

Persistency Manager 250, as previously described, provides a persistency service for any of the components of the system 112 that require any persistency level.

Figure 3:
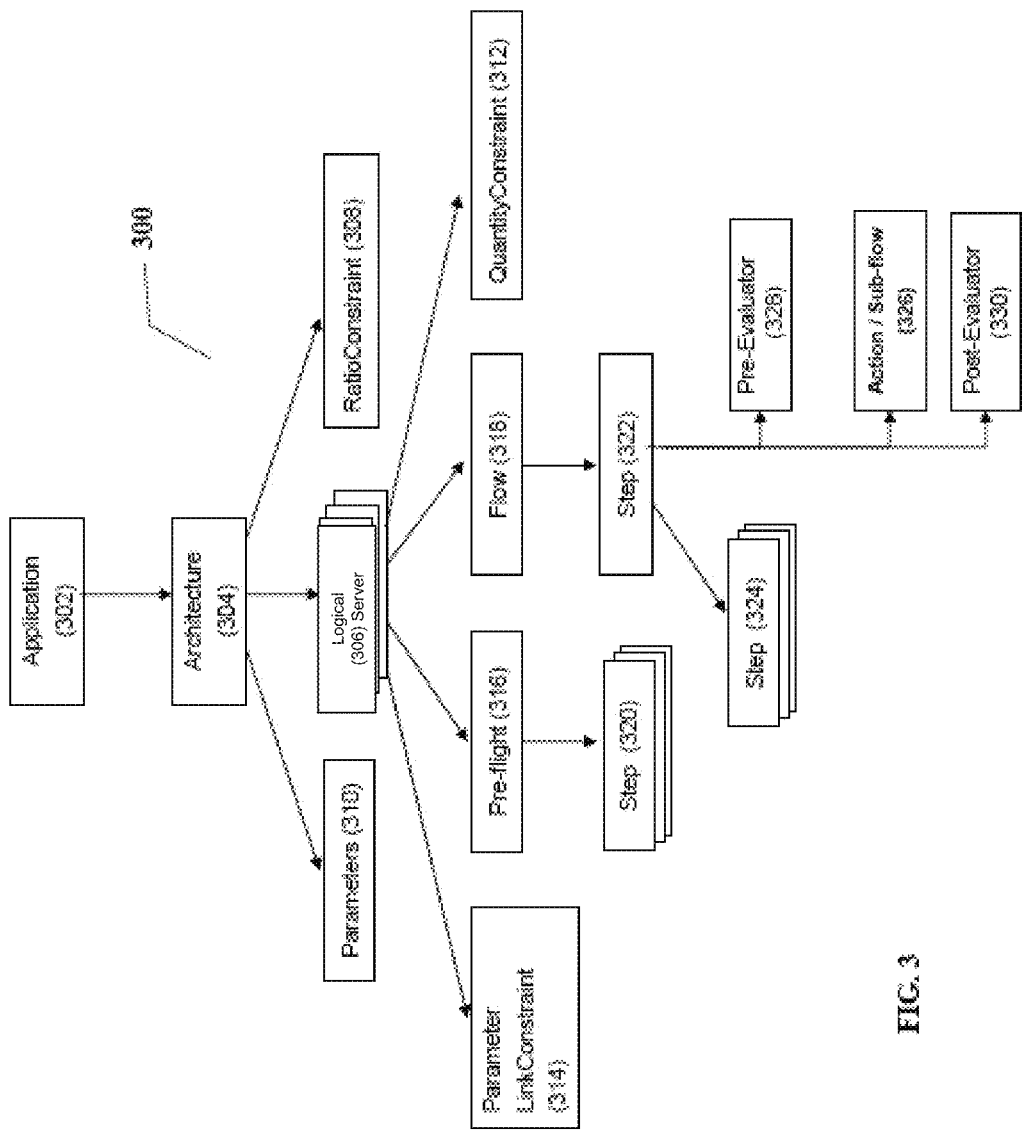
FIG. 3 shows an exemplary management server data model 300 for supporting the above described functions.

FIG. 3 shows an exemplary data model 300 for supporting the above described functions of the management server (not shown). As shown, data model 300 preferably features an application data type 302 for representing the different components in the target system. The specific application which is represented may optionally be included in more than one package. Each application data type 302 includes all of the architectures and flows required for a specific component.

An architecture data type 304 holds the system structure with regards to computational devices, the links and the constraints between them. In addition, architecture data type 304 holds the parameters required for all flows to be executed. Architecture data type 304 in turn receives information from the three data types which are subordinate to it in the hierarchy, as described below.

A logical server data type 306 is used to store all the required knowledge for the automation process of any computer on the computational network, such as a server for example, and may optionally be termed a server template. Logical server data type 306 is the logical representation of a computer that is being deployed by a real computer, and includes all the required information for the automation on a specific computer.

Various constraints may optionally be expressed or included in the model. One non-limiting example is a Ratio-Constraint data type 308 which includes the required or "ratio" constraints between the different computers in a specific architecture. By having such constraints between computers, the user is able to deploy an application only in a structure that satisfies (or is supported by) the different components that are available on each computer. Some examples of such constraints between computers include but are not limited to the following:

1. Every Reports server requires a dedicated instance of DB
2. Database can work with up to 3 instances of Reports server
3. Reports server must have at least one Database Such constraints may optionally be "hard" constraints or "soft" constraints. A "hard" constraint preferably must be fulfilled in order for a computational device to be considered for a particular role or task in the deployment/maintenance process and/or software operation. A "soft" constraint is not necessarily fulfilled but instead is given a weight, indicating the relative preference for being fulfilled. For example, the amount of memory available in a computational device may optionally be a hard constraint below a certain level (for example for deploying a particular component) but may alternatively and optionally be a soft constraint above the minimum level but below an optimal or preferred level. Optionally and preferably, a plurality of soft constraints may together form a hard constraint, as a minimal number of such constraints may optionally be required for deploying a particular component and/or another type of role or function in the automation process.

Constraints may also optionally and preferably in combination with a topology analysis, preferably an automated topology analysis, in order for recommendations to be made regarding deployment of a particular component or components on one or more selected computational devices. For example, optionally an analysis of the number of expected or current users would indicate the number of computational devices that are required, such as report servers, databases and so forth. The constraints could optionally be used to recommend the number of each type of device and/or the preferred or recommended configuration.

Constraints could also optionally and preferably be used for determining when to automatically include a particular type of computational device to a topology map, for example in the DevStudio process (as previously described with regard to FIG. 1), preferably from a list of available computational devices.

A parameter data type 310 represents the data objects required for the execution of an action. Parameter data type 310 can be updated by the same step, by another step being executed in the same server, or by other flows on different servers. Data stored in parameter data type 310 may optionally be used for:

1. Sharing of data
2. Accepting user inputs
3. Controlling the Flow execution

The next four data types are controlled by logical server data type 306 as shown as they are below it in the hierarchy. A QuantityConstraint data type 312 is used to limit the number of instances of a computer and can be a minimum or a maximum constraint or both. Some non-limiting examples of the use of such a constraint are as follows:

1. Reports server must have at least one instance
2. Reports server can have up to 5 instances
3. Reports server has exactly 3 instances A ParametersLinkConstraint data type 314 is used to point out and describe the parameter dependencies between different computers. Some non-limiting examples are as follows:

1. A parameter in the Reports server uses the value given to a parameter in the Admin server 2. A Step in the Reports server should complete successfully before another Step in the Database. The order in the Steps execution flow is controlled by parameter that one step sets its value and the other Step reads its value and decides to proceed or not A pre-flight data type 316 relates to pre-flight steps 320, which define the conditions (hardware, software, network) that have to be met in order to continue to the deployment on the real server.

A flow data type 318 represents the deployment instructions, enabling the software to be self deployed on a target server. Flow data type 318 includes flow steps 322 to be executed and handles the execution of the architecture workflow. This includes the initiation point for execution of the workflow and a status report for the entire flow (with all flow steps 322 included)

Each flow step 322 is a node in the execution graph of a flow according to flow data type 318. Each flow step 322 contains the actual work to be done in the automation plan (implemented as a Flow of Steps). Each flow step 322 also contains a set of conditions to be checked before and after the actual work. A step 322 can also optionally group other steps 324 to be executed in turn for execution of a complex step as shown. Each step 322 preferably includes information regarding each next step to perform and what to do in case of failure of execution, as well as how to report status of execution.

An action is the actual work of the step, and is represented by an action data type 326. Each action is the basic and atomic command that a single step is executing. Some non-limiting examples are: Start Process, Stop Process, Run Command, Configuration Command, etc.

Every action includes:
1. In Parameters—parameters that are consumed by Action, when the Action starts its execution it resolves all the parameters it requires. If the parameter is not resolved, meaning its value is not already set at that time, the execution is delayed till the parameter gets its value.
2. Operation to execute (run method)
3. Out Parameters—parameters that are updated by the action, usually results of the operation.

All kind of instructions are represented as an Action. Some non-limiting examples of operation types:
1. Configuration
2. Installation
3. Restart
4. Stop process
5. Run process
6. Call application API
7. Run script
8. File handling (copy, change, lookup, search, etc. . . . )
9. Verifications
10. Packaged application best practice operations
11. User defined operations (self implemented Actions)
12. Manual operation action (process waits for user to do manual action, preferably with a specific request to the user; after approval by the user, the process continues); and others.

An action data type 326 may optionally include information regarding a sub-flow, which is a group of steps 324 that represent a complex step; the status is preferably determined by the execution of all of its steps. For example if a step that deploys a mySQL database is added to the plan, then the deployment of the database is preferably added as a sub-flow to that step.

A step may optionally feature a pre-evaluator data type 328, which is a condition that determines whether the action and/or the sub-flow will be executed. The result of a pre-evaluator is True or False in which it determines whether continue action execution. When the pre-evaluator starts its execution it resolves all the parameters it requires. If the parameter is not resolved, meaning its value is not already set at that time, the pre-evaluator waits until the parameter receives its value.

A step may optionally feature a post-evaluator data type 330, which is a condition that determines whether the flow continues to the next steps connected in the flow graph. Each post-evaluator data type 330 is validated after the action and/or the sub-flow were executed.

Figure 4:
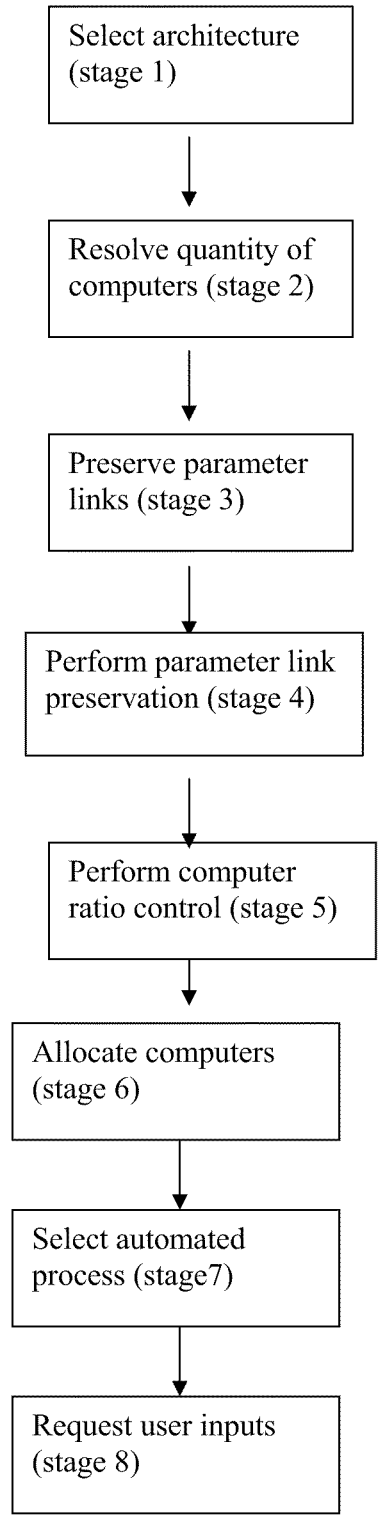
FIG. 4 is a description of an exemplary, illustrative method for deployment modeling according to the present invention.

FIG. 4 is a description of an exemplary, illustrative method for automation modeling according to the present invention. As previously described with regard to FIG. 1, the deployment/maintenance plan provided by the DevStudio is preferably modified before being distributed to the agents for execution. In stage 1, preferably a copy of the plan is made for editing, called a workspace, thereby enabling the system to be reset to return to the original plan if necessary. More preferably, all user operation modeling is performed on the workspace. Next, in stage 2, the modification process preferably begins with architecture selection, which preferably includes maintaining everything that is related to the selected architecture on the workspace, and deleting the other architectures. In stage 3, the quantity of computers is resolved, by creating new instances for each logical server according to the selected architecture and also according to any modifications by the user of the selected architecture, by modeling the selected architecture to reflect the operation environment needs. Preferably constraints are maintained or calculated based on one or more changes in the operation environment, for example when increasing or decreasing the quantity of logical servers while modeling the actual process automation architecture. Each change requested by the user is validated first with the Modeling Monitoring and Control process to meet those constraints.

In stage 4, parameter link preservation is performed (preferably by the Modeling Monitoring and Control process) to make certain that any changes requested by the user that involve adding/removing a logical server instance still satisfy each parameter link in the model. In addition the direction of each parameter link can be modified in the user interface and instantly reflected in the model.

In stage 5, the Modeling Monitoring and Control process preferably performs computer ratio control, in order to maintain the ratio constraints between logical servers or components, when modeling the actual user requested architecture. In stage 6, the computers are allocated, by mapping a logical server to a real server or a real computer; the Modeling Monitoring and Control stores the machine name and IP address in the physical server. In stage 7, user inputs are requested, as the Modeling Monitoring and Control scans all of the parameters that require user inputs, and preferably the user interface displays the list of required inputs (preferably even before the automation starts).

In stage 8, parameters are resolved as the parameter registry handles the requests for parameter values. The Modeling Monitoring and Control preferably updates each parameter with the real value obtained from the user before the automation process.

Stage 9 preferably involves building the execution plan for automation at each computer, including modifications for each instance of the logical servers so it reflects all of the needed information for the automated processes to operate, for example user inputs, constraints, links, dependencies and required files for implementation in a specific environment.

Figure 5:
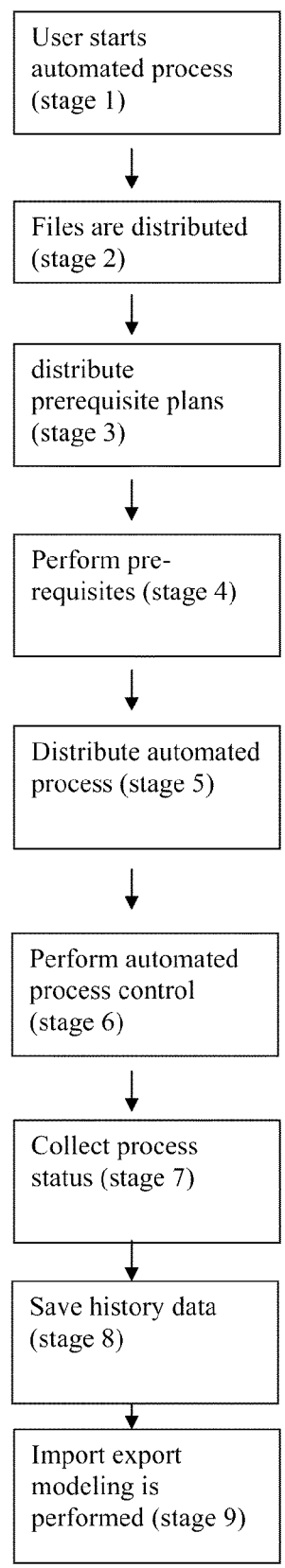
FIG. 5 is a description of an exemplary, illustrative method for deployment execution according to the present invention.

FIG. 5 is a description of an exemplary, illustrative method for deployment execution according to the present invention. It should be understood that this description is given for the purpose of illustration only and that other automated processes are contemplated within the scope of the present invention. As previously described with regard to FIG. 2, deployment execution is controlled by the Modeling Monitoring and Control process and involves execution of the previously described flows and steps by the agents. Deployment execution preferably includes three overall stages: Pre-deployment checks, Deployment, and Logging. Specific stages are described in greater detail below.

The execution of the deployment plan starts when the user selects to start the automated process in stage 1. In stage 2, the Modeling Monitoring and Control distributes plans. When selecting to start the pre-automation checks, the pre-automation plan for each server is distributed to the relevant agents and the agents start their execution upon acceptance.

In stage 3, pre-automation process control is performed. After the start command preferably by the user (for example having the user press the "Deploy" button), a listener object is created for each agent for accepting the results for the pre-deployment check plan execution. In stage 4, after the user preferably starts the deployment process itself, application packages are distributed. Before sending deployment plans, the Modeling Monitoring and Control sends the application files to the agents, each of which receives the relevant files required for its deployment plan to be executed.

In stage 5, deployment plans are distributed. The Modeling Monitoring and Control distributes the deployment execution plans to the agents. Once agent receives a flow it preferably starts execution of the flow.

In stage 6, deployment process control is performed. The Modeling Monitoring and Control can send the following commands to the agents upon receipt of user requests: pause, resume and stop. These are described in more details as follows:

a. Pause command—when the agent gets a Pause command, it pauses the execution of the flow. Each step in the flow that is in execution while accepting the pause command preferably completes its current operation(s), and then enters a safe mode. Safe mode is preferably determined by each operation, as the best stage in its execution to stop.

b. Resume command—the Modeling Monitoring and Control makes this option enabled when the system enters a paused mode. When selecting to resume, the Modeling Monitoring and Control sends a Resume command to all the agents, and they continue their flow execution from the point they were paused in.

c. Stop command—when the user selects to stop the deployment execution, the Modeling Monitoring and Control sends a Stop command to all the agents, each completes its current action and aborts. The execution of the current flow preferably cannot be resumed from that point, but instead is preferably required to start from the beginning. More preferably, the options at this point include performing a rollback to a previously working state of the system, or alternatively performing a rollback of the entire system and then starting the deployment process again.

In stage 7, deployment progress logging is initiated. When the deployment process starts, the Modeling Monitoring and Control allocates a listener object that gets the log events from the agents and the management console displays the log events in the user interface log panel.

In stage 8, status reporting is initiated. When needed for display in the user interface, the management server asks the Modeling Monitoring and Control for the status report of the entire deployment plan. The Modeling Monitoring and Control listener object accepts status events from the agents and builds the status map for the central management server. Individual events may also optionally have their status displayed upon receipt.

Figure 6:
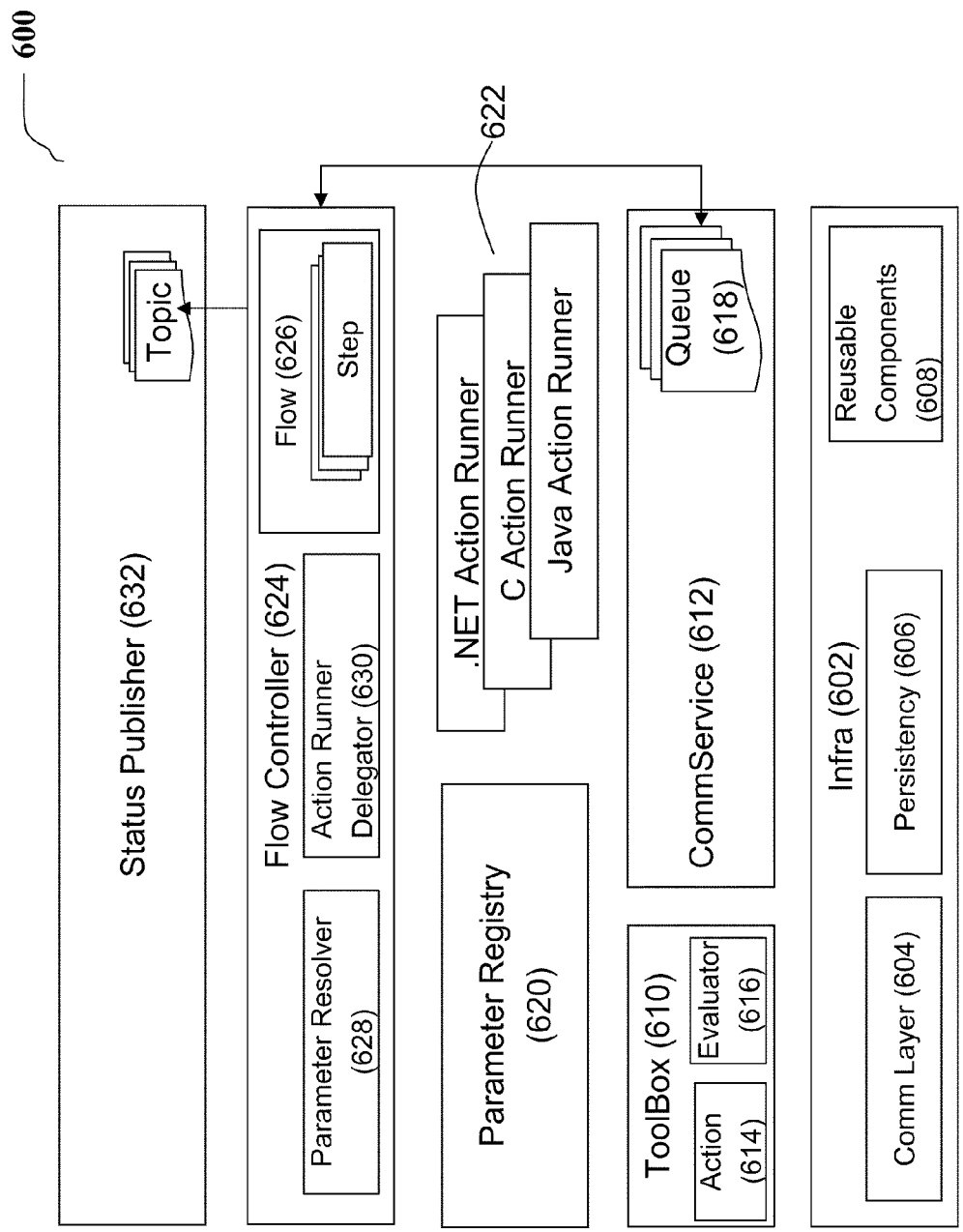
FIG. 6 shows a schematic block diagram of an exemplary, illustrative agent architecture according to the present invention.

In stage 9, import/export modeling is optionally performed, as the entire data model can be imported and exported when requested. The Modeling Monitoring and Control is capable of exporting the data model to a file that when needed can be imported by the Modeling Monitoring and Control in the same management server or another central management server. When importing a data model, the Modeling Monitoring and Control builds all the necessary objects of the imported data model. The objects are:

a. Parameter registry—including all the parameters
    b. Architectures—including logical servers (computational devices), constraints, and quantities
    c. Flows
    d. Steps/Actions
    e. Topology
    f. Components FIG. 6 shows a schematic block diagram of exemplary, illustrative agent architecture according to the present invention (a agent is also shown in FIG. 1. As shown, an agent 600 preferably features some components which are similar to those of the management server of FIG. 2. For example, agent 600 preferably also features an infrastructure layer 602, with a comm layer 604 and a persistency module 606, preferably fulfilling similar functions as for the infrastructure layer of FIG. 2. In addition infrastructure layer 602 features reusable components 608 which may optionally be used for various aspects of the process automation.

Above infrastructure layer 602, agent 600 preferably features a toolbox 610 and a CommService 612. Toolbox 610 is a collection of actions 614 that are used in the automation plan to be executed by agent 600, along with an evaluator 616 for evaluating these actions (see also FIGS. 3-5 for a description of actions and evaluators). Briefly, action 614 includes an execute method for action implementation; pre and post execute methods; In-Parameters for inputs; and Out-Parameters for results. Each action 614 is the implementation of a pre-defined operation for auto deploying any application. Actions 614 are of different types, including but not limited to:

1. OS (operating system) specific
    2. SW (software)/HW (hardware) lookup & checking—system calls
    3. Configuration—parameter re-writing
    4. Installation—scripting, packaging, file copying, run command
    5. Internal actions—target application API
    6. External actions—Web-services activation, open URL, DB queries
    7. Verifications
    8. Rollback Evaluator 616 is a type of action with a boolean result, used to control the flow based on local evaluations and sync with other agents 600. The action and sub-flow execution depends on the results from pre-evaluators, while the execution of the next steps to be performed after the current step depends on the results of the post-evaluators (see FIGS. 3-5 for a description).

CommService 612 manages communication between agents 600 and central management console 112, and between agents 600 themselves. CommService 612 maintains a queue 618 in each agent 600 for these messages.

Parameter registry 620 preferably operates as previously described in FIG. 2.

Agent 600 also preferably features a plurality of action runners 622, each of which is adapted to permit execution of an action 614 through a particular programming language and/or environment. Non-limiting examples of such runners 622 include .NET, C, Java, scripting languages and so forth. Each runner 622 preferably runs as a separate process from agent 600 (not shown), and preferably communicates with agent 600 using comm layer 604 on a pre-defined queue (not shown).

Action runner 622 preferably operates according to the following common procedure. First, action runner 622 creates an instance of the relevant action. Next, action runner 622 resolves the action in-parameters and then executes the action. Finally, action runner 622 resolves the action out-parameters (results).

The next layer of agent 600 is a flow controller 624, which manages the automation flow at the designated computer on which agent 600 is installed. Flow controller 624 controls the flow execution and listens to central management console requests, including but not limited to, Start, Stop, Pause, Resume and Rollback.

Flow controller 624 components preferably include a flow component 626, for representing the automation plan as a graph of Steps that point to other Steps, as described in FIGS. 3-5 and also as described in greater detail below. A parameter resolver 628 preferably connects to Parameter Registry 620 if a parameter value is required and also preferably synchronizes parameters with other agents 600.

An ActionRunner delegator 630 preferably acts as a bridge to the relevant ActionRunner 622 that is running in a separate process on the same computer. ActionRunner delegator 630 also accepts the status and results from the Action execution and reports it to a Status Publisher 632.

Status Publisher 632 preferably accepts status events from flow controller 624 (ActionRunner delegator 630), and causes the status map to remain persistent. Status Publisher 632 also preferably publishes the flow status. With regards to status reporting, the status of each step is preferably determined by the success states of its action result, the step-sub-flow result, and the evaluators result (see also FIG. 7 below for a more detailed explanation). The step-sub-flow status is preferably determined by the status of all the steps included in the sub flow. The status of the flow is preferably determined by the status of all the steps included in it.

Figure 7:
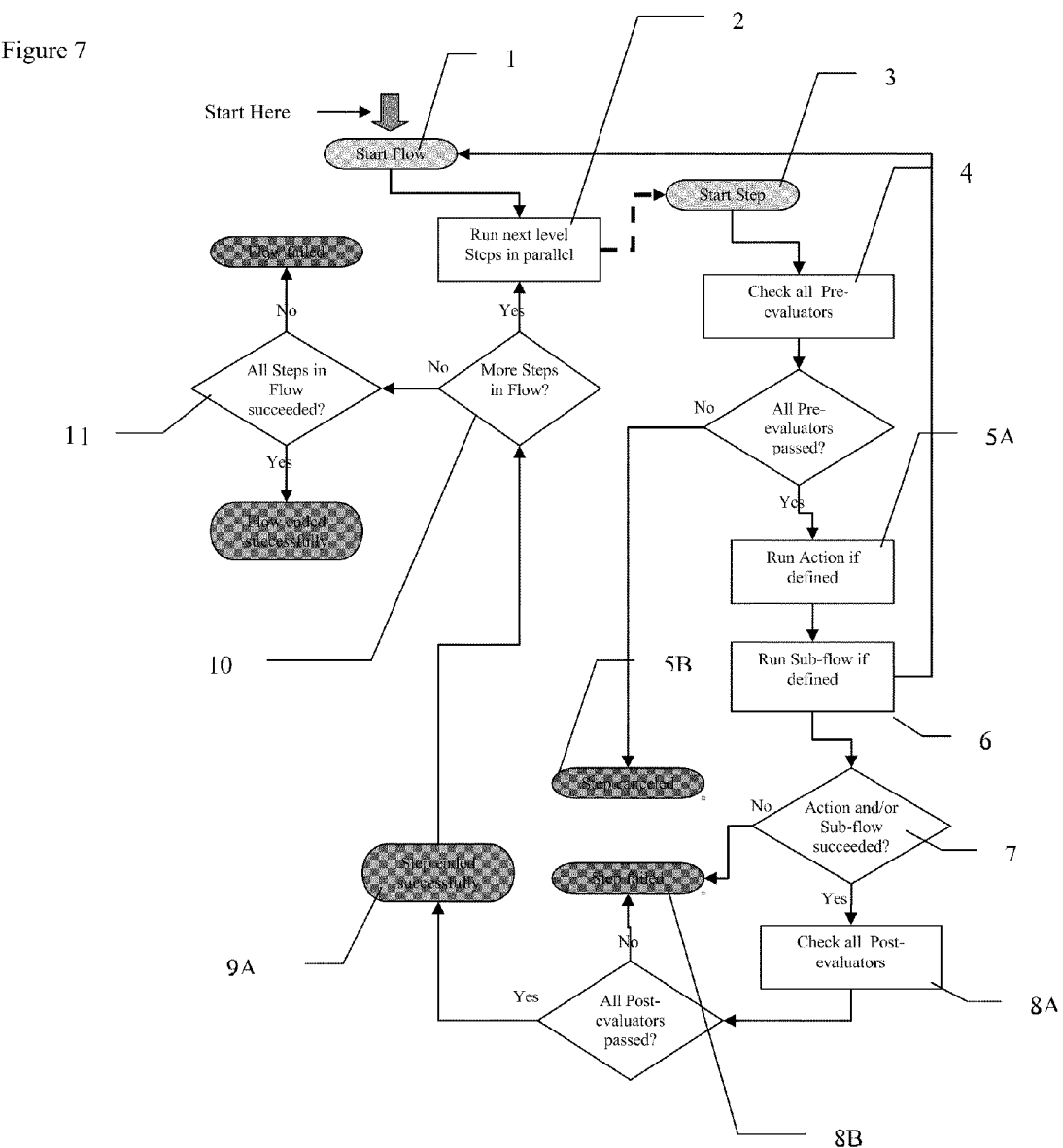
FIG. 7 is a description of an exemplary, illustrative method for deployment execution by each agent to the present invention.

FIG. 7 is a description of an exemplary, illustrative method for deployment execution by each agent according to the present invention. The basic method according to which the flow is executed is described as follows. In stage 1, flow execution is started. In stage 2, the agent prepares to run the next steps in parallel. In stage 3, each of these steps (the next steps as mentioned before) is started.

In stage 4, the agent checks the pre-evaluators; if they pass then the flow continues to stage 5A; otherwise the execution of that step ends at stage 5B.

In stage 5A, the agent runs the step's action if defined. In stage 6, the step's subflow is run by the agent if defined. Sub-flow preferably includes a flow of steps, and its execution is the same as the main flow execution, and the status of the parent step is determined by its sub-flow execution.

In stage 7, the action and/or subflow are checked to see whether they succeeded.

In stage 8A, the post-evaluators are checked if the action and/or subflow succeeded; otherwise in stage 8B the step is determined to have failed. If the post-evaluators are checked and if they succeeded, then in stage 9A it is determined that the step ended successfully and the method proceeds to stage 10. Otherwise again the step is determined to have failed (stage 8B).

In stage 10, the agent determines whether there are more steps in the flow, and to which step the current step points to; if so then the above process is repeated. Otherwise in stage 11, the agent determines whether all steps were performed successfully. If so then the deployment execution of the current flow succeeded; otherwise it failed. If the current flow is the main execution flow, the completion of all the steps and complex step included in that main flow, concludes the deployment execution at the agent.

According to some embodiments of the present invention, a deployment solution may optionally be provided over the Internet, for example over the web, as a service (as SaaS).

According to other embodiments of the present invention, preferably the agents are installed on the computer(s) of the organization; these agents preferably receive the automation plans from the remote site and run the automation plan locally. Preferably, the remote site supports multiple users from multiple organizations. Optionally and alternatively (or additionally), the agents communicate to each other directly in a "peer to peer" manner.

For example the DevStudio and console functionality may optionally be provided remotely from the remote site such as a data center, while communicating with the locally installed agents. The automation flow and local automation plans are preferably received from the remote site for local execution.

Figure 8:
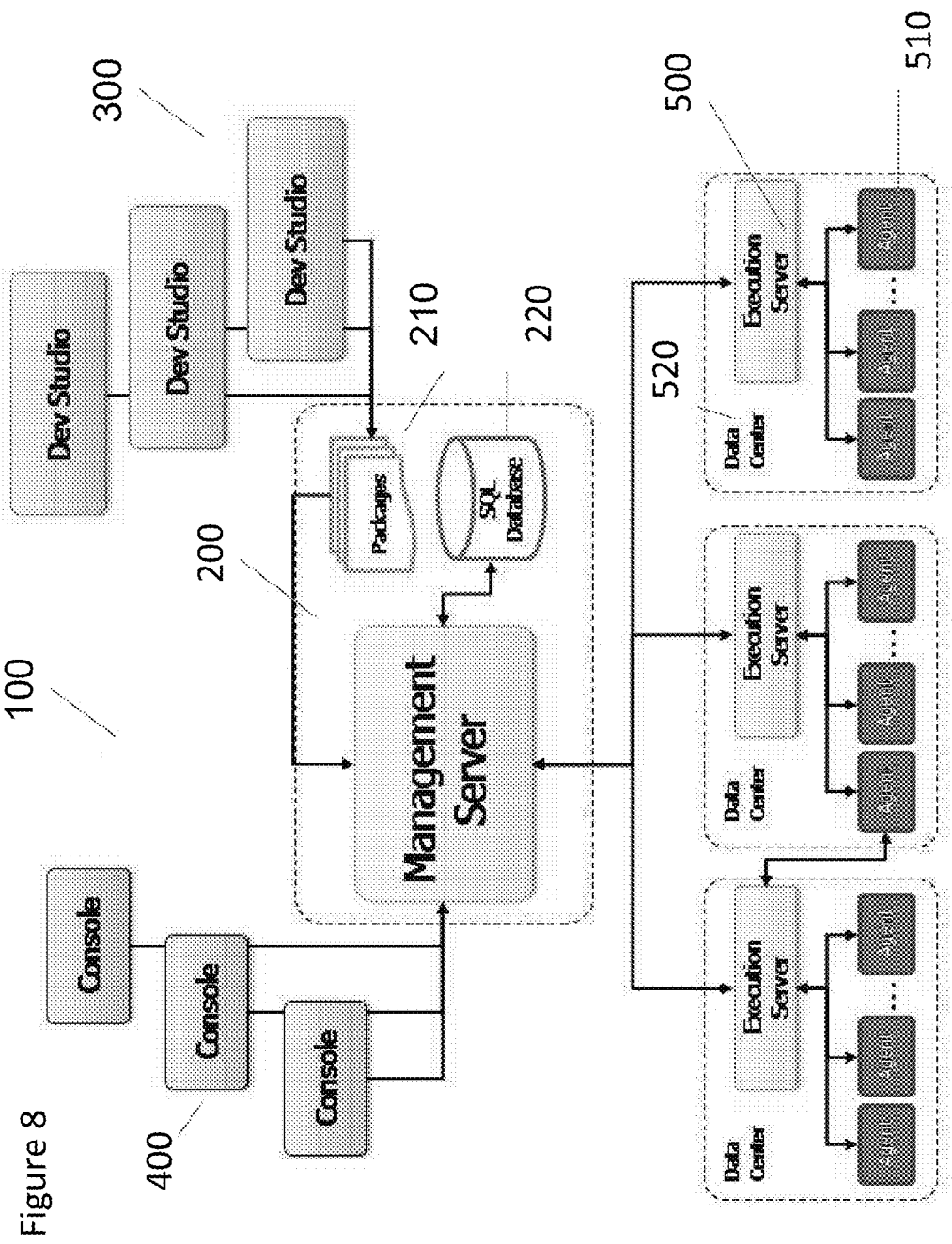
FIG. 8 is a schematic drawing of the system.

FIG. 8 is a schematic drawing of an illustrative exemplary system according to the present invention in at least some embodiments, featuring a hierarchical structure. System 100 optionally features a management server 200, at least one dev studio 300, one console 400, one execution server 500 and one agent 510. The system 100 comprises a designing function which is implemented by one or more DevStudios 300. DevStudio 300 preferably enables a plurality of constraints to be set according to the selected architecture (quantity and ratio constraints). The process of modeling in the DevStudio 300 preferably uses these constraints for the selected architecture. Optionally and preferably, the DevStudio 300 module performs one or more of defining the components, collecting information about the Steps to be performed for each component, defining the architectures for the target applications, and/or defining the automation flows for each architecture. For the purpose of description only and without wishing to be limiting, it should be noted that a component is a component of the application that can be deployed on one or more servers of the application. The DevStudio 300 module preferably includes a conflict detection manager which detects problems that may or do arise during automation flow execution. Optionally and more preferably the conflict manager builds a data structure for storing and optionally displaying the problems (conflicts) with descriptive labels, thereby enabling the user to understand their main causes. Dev Studio 300 was previously described in more details in FIG. 1*b*.

The output of each DevStudio 300 is preferably transferred to the management server 200 which combines the output with automation map to generate the final software packages 210. The packages 210 are used to execute the automation process or to execute jobs or commands on already installed agents 510. The packages 210 are preferably kept in the SQL database 220 which optionally resides in the management server.

To assist the user in executing the automation process with such packages 210, the system 100 preferably features one or more consoles 400 for user interactions. The console 400 is used by the operator for issuing the automation process or issuing other commands or jobs after the agents 510 are installed on the computer. The console's 400 architecture includes a GUI (graphical user interface) layer (not shown) for supporting an interface with the user (it should be noted that any type of suitable interface may optionally be provided and that a graphical interface itself is optional but not required); a controller layer (not shown) for controlling the overall implementation of the Modeling Monitoring and Control (automation modeling and control) process; a logic layer (not shown) for supporting the overall flow of the automation process, preferably including any adjustments to the automation map; a utilities layer for supporting operation of various components of the console 400; and an infrastructure layer (not shown) for managing communication between management server console 400 and the execution servers 500 and persistency issues for all other components of management server console. The console 400 may optionally be implemented as described previously in FIG. 2.

The system 100 preferably also features one or more execution servers 500. Each execution server 500 is preferably responsible for a data center 520 by interfacing between each agent 510 that is installed in a computer that belongs to this operation environment (for example data center) and the management server 200. The execution servers preferably communicate with each other via the management server 200. Communication is preferably implemented by HTTP. Agents 510 are preferably used for deploying the software on the computers and for performing any other jobs after the automation process has been executed.

Figure 9:
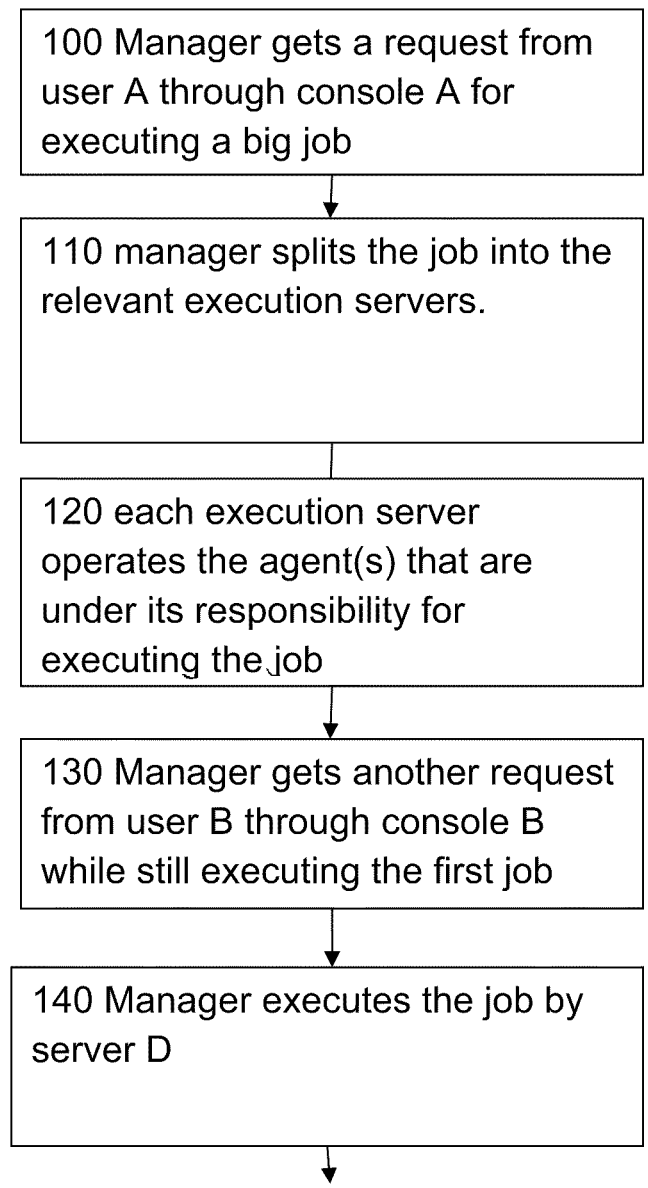
FIG. 9 shows a schematic block diagram of an exemplary, illustrative behavior of the management server with regard to executing jobs.
Figure 9:
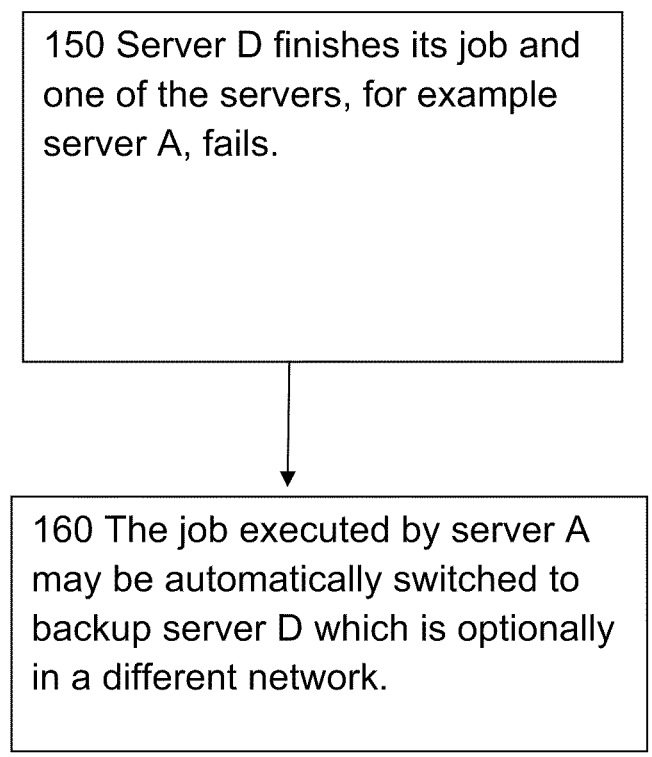

FIG. 9 shows a schematic block diagram of an exemplary, illustrative behavior of the management server with regard to executing jobs. According to the embodiment of the present invention, the system optionally has one manager or a plurality of managers. Each of them can optionally be responsible for one or more data center by controlling one or more execution server. The management server optionally distributes the job between the execution servers that are responsible for the computers on which the automation is to be performed. The execution servers can be configured to backup each other. In this case the management server can use redundancy mechanism in order to switch the job from a failed server to an idle working server. A plurality of jobs from a plurality of users who may be in different area of data centers can be executed by the manager. The manager can simultaneously handle several requests from different users. Management server can work on a plurality of packages and can determine order or connection between the packages for execution sequence.

The first illustrative, exemplary method scenario shown in FIG. 9 describes the distribution of the automation process between the execution servers. First the management server receives a request from user A through user A console (console A) for executing a big job (100). The manager splits the job between the execution servers that are responsible for the computers on which the automation has to be performed. In this example servers A, B and C perform the job (110). The manager coordinates the servers' activity. Each executing server deploys the agents that are under its responsibility (120).

The second illustrative method example shown in this diagram is of parallel execution of two different jobs from two different users. While executing job A, the manager receives another request from user B who is using his console to request execution of job B (130). The manager executes the job by server D which is currently not busy (140) and is responsible for the computers on which the automation has to be performed. If execution server D is busy then the user may opt for either automatically executing the job when execution server D finishes his current job or stopping the job. The last example illustrates a redundancy scenario. Execution server D is configured as a backup server for execution server A. Server D finishes its current job while server A fails in the middle of the execution (150). The manager automatically switches the job to be executed by server D (160).

Figure 10:
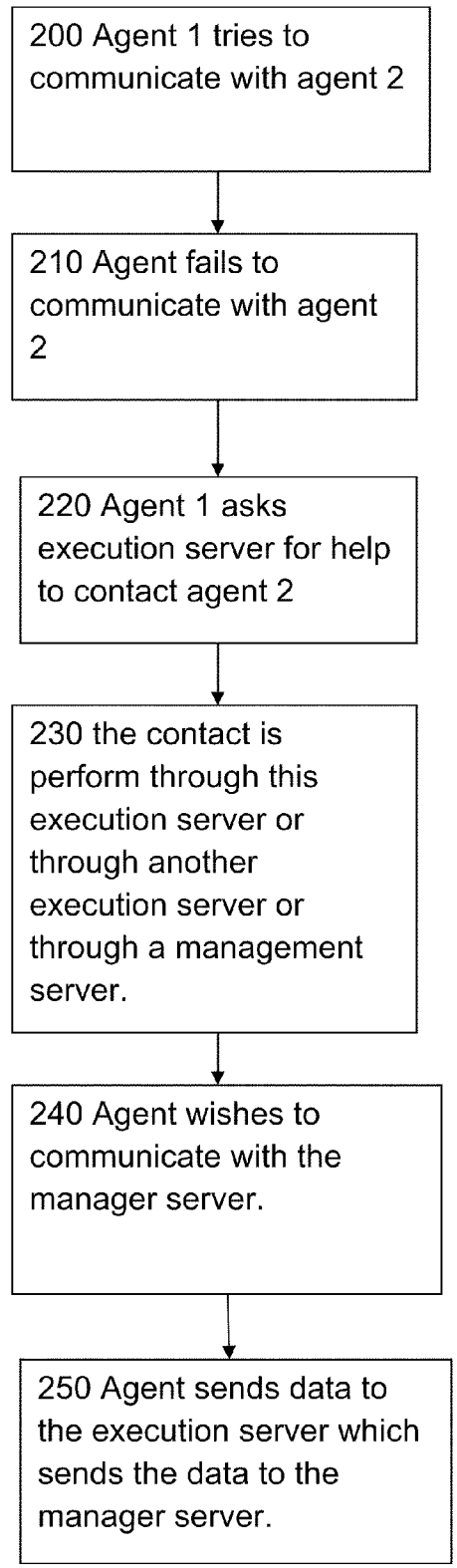
FIG. 10 shows a schematic block diagram of exemplary, illustrative scenarios describing the interaction of an agent with other agents and with the execution server.

FIG. 10 shows a schematic block diagram of exemplary, illustrative scenarios describing the instruction of an agent with other agents and with the execution server. In the scenario described in the diagram agent 1 tries to communicate with agent2 (200); however the communication fails (210). Therefore agent 1 asks the appropriate execution server to assist agent 1 in contacting agent2 (220). The contact is performed either through this execution server or through another execution server or through a management server or through any combination of the entities described herein (230). In another scenario the agent wants to transfer data to the manager server (240). The communication is done via the execution server (250). Data may optionally comprise for example log files or a production of the computer or any other data. The data can optionally be stored in the data base or it can optionally be sent to another computer(s).

Figure 11:
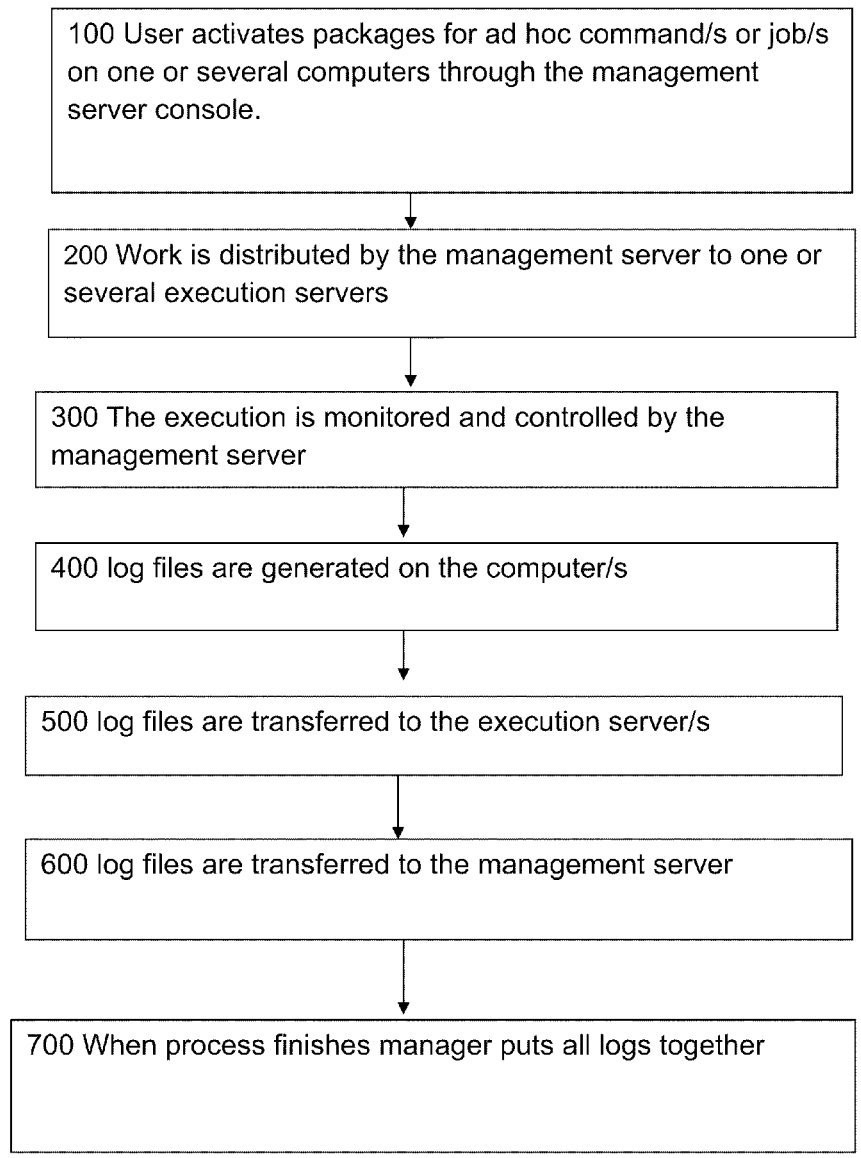
FIG. 11 shows a schematic block diagram of exemplary, illustrative scenarios for issuing ad-hoc or periodic commands or jobs on the computers on which the agents are installed.

FIG. 11 shows a schematic block diagram of exemplary, illustrative scenarios for issuing the activations of ad-hoc or periodic commands or jobs on the computers on which the agents are installed. According to some embodiments of the present invention, one or more agents can be told by the system to run an add hoc command or job, or to periodically activate a command or a job. This can optionally be done by activating a pre-defied package by the operator, using the console. First the user activates the package for issuing command/s via the console (100). Then the work is distributed to the appropriate execution servers who handle the desired agents (200). The execution servers send the request to the appropriate agents who start performing the command. The commands can be for example for putting down/bringing up a process or a service on the computer, starting/stopping/restarting a service, performing a diagnostic test on the computer, executing a disaster recovery process and any other command that can be issued on a computer or on plurality of computers on which the agent is installed. The execution is monitored and control by the management server (300). During this process log files are optionally generated on the computer (400). The operator can view the results and status of the process via the console. During the execution log files are optionally are transferred to the execution server (500) and from the execution servers to the management server (600). When the process is finished the manager optionally put all the logs together and can optionally transfer the data by email/FTP or any other mean to another computer optionally for further analyzing (700).

Figure 12:
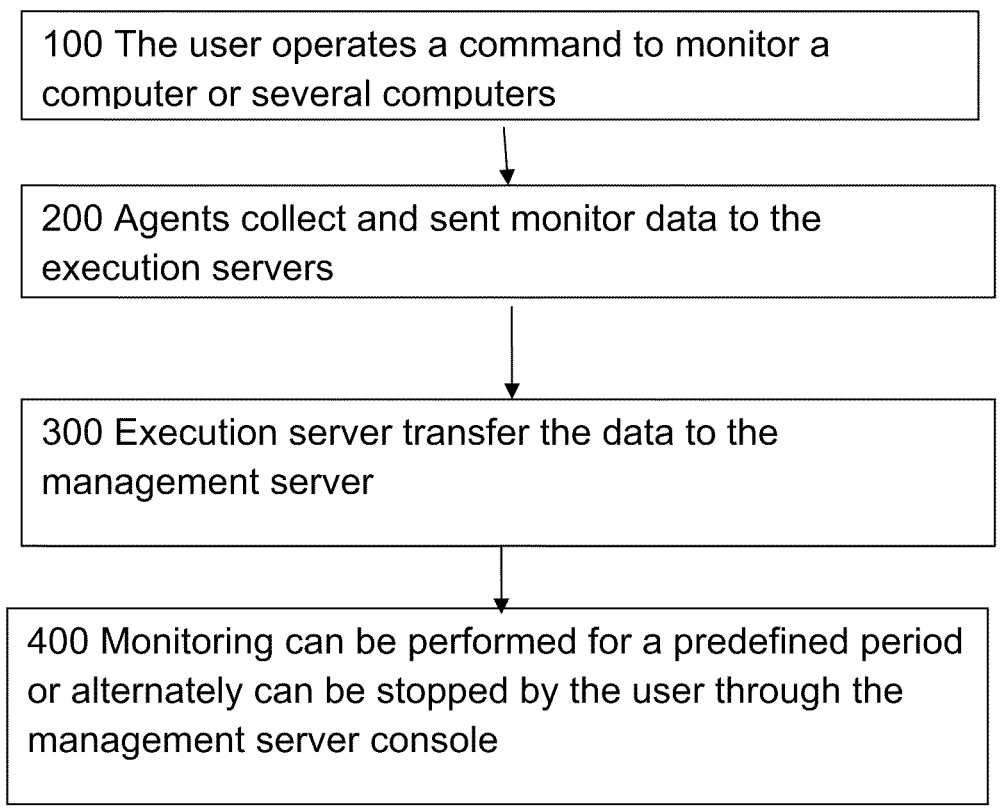
FIG. 12 shows a schematic block diagram of exemplary, illustrative scenarios describing the process that is used for monitoring devices by the agents.

FIG. 12 shows a schematic block diagram of exemplary, illustrative scenarios describing the process that is used for monitoring devices by the agents by for example sniffing and taking screen shots. According to some embodiments of the present invention, the agent can also be used for monitoring the computer on which the agent is installed. First the user operates the desired package, via the console to monitor a computer or several computers (100). The monitoring can also be performed automatically as a result of the automation. Next the agent on each monitored computer starts collecting and sending monitoring data to the execution server that interfaces with this agent (200). Data can be, for example screen shots, log files, error files, statistical information and any other data that is required for monitoring the computer. The agent can optionally send alarms which can be displayed on the console. The execution server transfers the data to the management server (300). Monitoring can be performed for a pre-defined period, or constantly or alternately can be stopped and/or restarted by the user, using the console (400).

While the invention has been described with respect to a limited number of embodiments, it will be appreciated that many variations, modifications and other applications of the invention may be made.

What is claimed is:

1. A method, comprising:
   automatically constructing a process for execution for a plurality of interdependent components in a computer network having a plurality of computers for process automation, wherein the plurality of computers is organized in a multi-tier hierarchy for a software application; and
   modeling the software application for said process automation, wherein said modeling comprises:
   selecting a software architecture at least partially according at least a parameter or a requirement of the computer network;
   operational modeling of the software application based on the software architecture;
   defining a plurality of constraints that are associated with elements in the computer network, the plurality of constraints comprising hard constraints, which must be fulfilled, and soft constraints, which are desired to be fulfilled;
   allocating the elements in the computer network based on the plurality of constraints responsive to fulfillment of the hard constraints;
   providing an agent at each computer in the computer network:
   providing a management server for controlling said agents, wherein said process automation is controlled at said management server; and
   constructing a model through interactions of said agents with said management wherein one of the hard constraints comprises a plurality of the soft constraints grouped together.

2. The method of claim 1, wherein said process automation comprises maintaining the application.

3. The method of claim 1, wherein said process automation comprises deploying the software application across the plurality of computers.

4. The method of claim 3, wherein said deploying the software application comprises a complete application deployment.

5. The method of claim 3, wherein said deploying the software application comprises deploying an update to a previously deployed application.

6. The method of claim 1 further comprising:
   executing said automated process for the software application through said agents, under the control of said management server.

7. The method of claim 6 wherein at least one agent communicates with at least other agent during execution of said automated process.

8. The method of claim 7, wherein a user adjusts of said automated process through said management server via a console.

9. The method of claim 8, wherein executing the automated process further comprises requesting at least one parameter of said user by at least one agent through said management server.

10. The method of claim 9, wherein the software application features a plurality of components on the plurality of computers in the computer network having inter-connected functionality.

11. The method of claim 10, wherein said inter-connected functionality requires adjustment according to at least one of the automation order or operation of the software after said process automation is performed.

12. The method of claim 11, wherein at least one aspect of the automation is constrained according to said inter-connected functionality.

13. The method of claim 12, wherein the process automation or maintenance is performed according to an automation plan.

14. The method of claim 13, wherein said automation plan or maintenance plan is modeled by said management server and wherein at least a portion of said deployment plan is distributed to each of said plurality of agents through execution servers.

15. The method of claim 14, further comprising automatically distributing files containing components of the software application to each of said plurality of agents through the execution servers.

16. The method of claim 15, wherein said computer network includes user access and control permissions for controlling one or more user interactions with the software application.

17. A method, comprising:
   defining a plurality of constraints that are associated with elements in a computer network, the plurality of constraints comprising hard constraints, which must be fulfilled, and soft constraints, which are desired to be fulfilled;
   allocating the elements in the computer network based on the plurality of constraints responsive to fulfillment of the hard constraints;
   providing an agent on each of the plurality of computers;
   providing a management server for managing said agents;
   automatically constructing a process for execution for a plurality of interdependent components in the computer network having a plurality of computers for process automation, wherein the plurality of computers is organized in a multi-tier hierarchy for a software application;
   selecting a software architecture at least partially according at least parameter or requirement of the computer network:
   performing operational modeling of the software application based on the software architecture:
   distributing one or more instructions to each agent by said management server according to said operational modeling of the software application; and
   executing said one or more instructions according to one or more interdependencies between the interdependent components;
   wherein one of the hard constraints comprises a plurality of the soft constraints grouped together.

18. A system, comprising:
   a processor; and
   a memory coupled to the processor and comprising computer readable code thereon that when executed by the processor causes the processor to perform operations comprising:
   automatically constructing a process for execution for a plurality of interdependent components in a computer network having a plurality of computers for process automation, wherein the plurality of computers is organized in a multi-tier hierarchy for a software application; and modeling the software application for said process automation, wherein said modeling comprises:

selecting a software architecture at least partially according at least a parameter or a requirement of the computer network;

operational modeling of the software application based on the software architecture;

defining a plurality of constraints that are associated with elements in the computer network the plurality of constraints comprising hard constraints, which must be fulfilled, and soft constraints, which are desired to be fulfilled;

allocating the elements in the computer network based on the plurality of constraints responsive to fulfillment of the hard constraints;

providing an agent at each computer in the computer network:

providing a management server for controlling said agents, wherein said process automation is controlled at said management server; and constructing said model through interactions of said agents with said management server;

wherein one of the hard constraints comprises a plurality of the soft constraints grouped together.

19. A system, comprising:

a processor; and a memory coupled to the processor and comprising computer readable code thereon that when executed by the processor causes the processor to perform operations comprising:

defining a plurality of constraints that are associated with elements in a computer network, the plurality of constraints comprising hard constraints, which must be fulfilled, and soft constraints, which are desired to be fulfilled;

allocating the elements in the computer network based on the plurality of constraints responsive to fulfillment of the hard constraints;

providing an agent on each of the plurality of computers;

providing a management server for managing said agents;

automatically constructing a process for execution for a plurality of interdependent components in the computer network having a plurality of computers for process automation, wherein the plurality of computers is organized in a multi-tier hierarchy for software application;

selecting a software architecture at least partially according at least parameter or requirement of the computer network:

performing operational modeling of the software application based on the software architecture:

distributing one or more instructions to each agent by said management server according to said operational modeling of the software application; and executing said one or more instructions according to one or more interdependencies between the interdependent components;

wherein one of the hard constraints comprises a plurality of the soft constraints grouped together.

* * * * *